(12) United States Patent
Yamasaki et al.

(10) Patent No.: US 7,773,568 B2
(45) Date of Patent: Aug. 10, 2010

(54) INTER-STATION TRANSMISSION METHOD, RADIO BASE STATION MONITORING METHOD, AND DEVICE USING THE METHOD

(75) Inventors: Hidetoshi Yamasaki, Hyogo (JP); Hitoshi Takai, Osaka (JP)

(73) Assignee: Panasonic Corporation, Osaka (JP)

( * ) Notice: Subject to any disclaimer, the term of this patent is extended or adjusted under 35 U.S.C. 154(b) by 368 days.

(21) Appl. No.: 10/575,533

(22) PCT Filed: Dec. 9, 2004

(86) PCT No.: PCT/JP2004/018403

§ 371 (c)(1),
(2), (4) Date: Apr. 10, 2006

(87) PCT Pub. No.: WO2005/057970

PCT Pub. Date: Jun. 23, 2005

(65) Prior Publication Data

US 2007/0025316 A1 Feb. 1, 2007

(30) Foreign Application Priority Data

Dec. 10, 2003 (JP) .............................. 2003-411443

(51) Int. Cl.
*H04J 3/00* (2006.01)
(52) U.S. Cl. ........................ 370/337; 370/315; 370/327; 370/347; 370/310; 370/471; 370/476; 370/316; 370/317; 370/318; 370/319; 370/320; 370/321; 370/322; 370/323; 370/324; 370/325; 370/326
(58) Field of Classification Search ................ 370/95.3, 370/104, 337, 315–327, 347, 310, 471, 476
See application file for complete search history.

(56) References Cited

U.S. PATENT DOCUMENTS 4,009,343 A * 2/1977 Markey et al. ............... 370/321

(Continued)

FOREIGN PATENT DOCUMENTS

JP 07-193859 7/1995

(Continued)

OTHER PUBLICATIONS

Takahiko Nishizawa et al. "Development of New DRSC Wireless Equipment complying with ITS" Hitachi Kokusai Denki Gihou, No. 3, pp. 10-22 (English Abstract).

(Continued)

*Primary Examiner*—Rafael Pérez-Gutiérrez
*Assistant Examiner*—Munjal Patel
(74) *Attorney, Agent, or Firm*—Wenderoth, Lind & Ponack, L.L.P.

(57) ABSTRACT

A inter-station transmission method of extending time allocated for a transmission path delay of an inter-station transmission path within a predetermined turnaround time, and increasing an inter-station transmission distance. A radio base station reproduces a clock synchronized with a BSU transmission clock DCLK used when transmitting downlink transmission data from a communication control station. The radio base station processes the downlink transmission data. The clock synchronization eliminates a necessity of data format conversion between the communication control station and the radio base station, a buffer accumulating transmission data in preparation for the conversion is not necessary. This reduces a turnaround time of a mobile communication system. When the inter-station transmission method is applied to dedicated short-range communications, having a fixed turnaround time, a distance between the communication control station and the radio base station can be increased by a distance according to the eliminated delay time.

12 Claims, 26 Drawing Sheets

U.S. PATENT DOCUMENTS

| | | | |
|---|---|---|---|
| 4,852,090 A * | 7/1989 | Borth | 370/347 |
| 5,293,380 A * | 3/1994 | Kondo | 370/337 |
| 5,613,211 A * | 3/1997 | Matsuno | 455/502 |
| 5,796,730 A | 8/1998 | Bellec | |
| 7,139,274 B2 * | 11/2006 | Attar et al. | 370/395.4 |

FOREIGN PATENT DOCUMENTS

| | | |
|---|---|---|
| JP | 08-237191 | 9/1996 |
| JP | 2001-036458 | 2/2001 |
| JP | 2005-079797 | 3/2005 |

OTHER PUBLICATIONS

Masakazu Shobu et al. "W-CDMA Base Transceiver Station", Matsushita Technical Journal vol. 47, No. 6., pp. 21-26 (English Abstract).

* cited by examiner (a)
(b)
(c)

INTER-STATION TRANSMISSION METHOD, RADIO BASE STATION MONITORING METHOD, AND DEVICE USING THE METHOD

TECHNICAL FIELD

The present invention relates to an inter-station transmission method, a radio base station monitoring method and an device using the methods, and particularly relates to a method for, in a mobile communication system for performing communications between a base station and a mobile station by means of a protocol of a dedicated short-range communication (DSRC) system, performing inter-station data transmission between a communication control station and a radio base station, which are connected by a wire and make up the base station, and a method for monitoring the radio base station from the communication control station.

BACKGROUND ART

In the field of mobile communications, a multi-station system is used for, for example, radio paging and an automobile telephone, because the multi-station system eliminates the necessity of handover, which is required when a user moves from one zone to the next, and uses less transmission power, thereby allowing a large service area to be covered. In recent years, the multi-station system has been expected to be applied to a road-to-vehicle communication system. The multi-station system comprises a plurality of radio base stations forming small radio zones in which the same data is transmitted almost concurrently to or received from each of the small radio zones with the same frequency, thereby forming one large service area.

As shown in FIG. 19, a conventional mobile communication system, to which the multi-station system is applied, comprises a communication control station 1100, a plurality of radio base stations 1200-1 to 1200-n and a mobile station 1300. The communication control station 1100 is positioned at some distance from each of the plurality of radio base stations 1200-1 to 1200-n. The plurality of radio base stations are connected to the communication control station 1100 by inter-station transmission paths 1400-1 to 1400-n, respectively. A base station includes the communication control station 1100, the plurality of radio base stations 1200-1 to 1200-n and the inter-station transmission paths 1400-1 to 1400-n, and the base station performs communications with the mobile station 1300. In such a system, in order to monitor the remote radio base stations 1200-1 to 1200-n from the communication control station 1100, each of the radio base stations 1200-1 to 1200-n is required to transmit, to the communication control station 1100, monitoring data indicating a state of the radio base station such as whether the radio base station is properly working, other than data received from the mobile station 1300.

In general, the conventional mobile communication system adopts a method in which wired cables such as fiber optics are used for the inter-station transmission paths 1400-1 to 1400-n, and a general-purpose interface is used for the communication control station 1100 and the radio base station 1200, thereby realizing inter-station data transmission with a transmission rate higher than that of a radio link (refer to non-patent documents 1 and 2). FIG. 20 shows an exemplary structure of a base station of a conventional mobile communication system to which the multi-station system is applied. FIG. 21 shows a detailed exemplary structure of a transmission path interface unit 1210 of FIG. 20. FIG. 22 shows a detailed exemplary structure of a transmission path interface unit 1120 of FIG. 20.

The communication control station 1100 includes the control unit 1110 and the transmission path interface unit 1120. The transmission path interface unit 1120 includes a data buffer 1121, a protocol control unit 1122, a clock signal source 1123, a PHY interface (I/F) unit 1124 and an optical media converter 1125. Each of the radio base stations 1200-1 to 1200-n includes the transmission path interface unit 1210 and a radio unit 1220. The transmission path interface unit 1210 includes an optical media converter 1211, a first PHY interface unit 1212, a first protocol control unit 1213, a downlink data buffer 1214, a first clock signal source 1215, a second clock signal source 1216, an uplink data buffer 1217, a second protocol control unit 1218 and a second PHY interface unit 1219.

On a downlink from the communication control station 1100 to the mobile station 1300, data such as transmission data directed to the mobile station 1300 and control data directed to the radio base station 1200 are transmitted from the control unit 1110 to the transmission path interface unit 1120. These data received at the transmission path interface unit 1120 are temporarily stored into the data buffer 1121, and sequentially converted, by the protocol control unit 1122, the clock signal source 1123, the PHY interface unit 1124 and the optical media converter 1125, into a transmission format that is based on a specification of a general-purpose interface (e.g., 100BASE-FX). The resultant data is then transmitted, with a transmission rate higher than that of a radio link, to each of the radio base stations 1200-1 to 1200-n via the inter-station transmission paths 1400-1 to 1400-n, respectively.

On the other hand, on an uplink from the mobile station 1300 to the communication control station 1100, a radio signal received at the radio unit 1220 from the mobile station 1300 is detected and modulated, and then converted into a digital baseband signal. The digital baseband signal is then transmitted, as reception data, to the transmission path interface unit 1210. Monitoring data is also transmitted from the radio unit 1220 to the transmission path interface unit 1210. The reception data and the monitoring data received at the transmission path interface unit 1210 are sequentially converted, in the same manner as that of the downlink, into the transmission format that is based on the specification of the general-purpose interface, and then transmitted, with the transmission rate higher than that of the radio link, from the radio base stations 1200-1 to 1200-n to the communication control station 1100 via inter-station transmission paths 1400-1 to 1400-n, respectively.

Thus, by performing the inter-station transmission between the communication control station 1100 and the radio base stations 1200-1 to 1200-n with the transmission rate higher than that of a radio link by using the general-purpose interface, it becomes possible to provide, other than a range for transmitting reception data from the mobile station 1300, an available range into which monitoring data can be inserted for transmission. Non-patent document 1: "Development of New DSRC Wireless Equipment complying with ITS", Hitachi Kokusai Denki Gihou, No. 3, pp. 10-22. Non-patent document 2: "W-CDMA radio base station device", Matsushita Technical Journal, Vol. 47, No. 6, pp. 10-22.

DISCLOSURE OF THE INVENTION

Problems to be Solved by the Invention

Among mobile communication systems using a TDMA system for a radio link, there are some systems in which, after a period of time from when a signal is received, a response signal (ACK/NACK) notifying whether or not the signal has been properly received is required to be returned within a same time slot as that used for receiving the signal. One such system is the dedicated short-range communication (DSRC) system complying with ARIB STD-T75. Here, a period of time from when a radio base station receives a signal from a mobile station until when a determination result is transmitted from the radio base station to the mobile station is defined as a turnaround time, during which the following processes are performed: a process performed in the radio base station for generating a reception data string by detecting and modulating a reception signal; a process for transmitting the reception data string from the radio base station to a communication control station; a process for determining whether or not the reception data string has been properly received in the communication control station; and a process for transmitting the determination result from the communication control station to the radio base station.

Hereinafter, the above described processes, which are performed in the base station within the turnaround time, are collectively referred to as turnaround processing. In the DSRC system, the turnaround time is set as a predetermined value.

FIG. 23 shows an exemplary structure of a TDMA frame of the ARIB STD-T75 used for the DRSC system. As shown in FIG. 23, the TDMA frame of the DSRC system is composed of, for example, a frame control message slot (FCMS) for frame control and a plurality of message data slots (MDS) for data transmission. The FCMS is a control slot allocated to only a downlink, and always exists as a head slot of a TDMA frame. A base station transmits, within the FCMS, a frame control message channel (FCMC) with a predetermined timing. The MDS is a slot allocated to both uplink and downlink. In the DSRC system, a station having received a message data channel (MDC) within the MDS slot is required to transmit in a t3 time after the reception, to a station at the transmitting end, an ACK channel (ACKC) that is a response packet notifying whether or not the MDC has been properly received. As described above, in the DSRC system, a period of time, i.e., the turnaround time, is set as a predetermined value t3, the turnaround time being a time period from when the base station receives the MDC packet from the mobile station until when the base station transmits the ACKC packet indicating whether the MDC packet has been properly received.

In such a system as the DSRC system, in which the turnaround time is set as a predetermined value, a delay due to reception signal processing in a radio base station is desired to be as short as possible. However, in an inter-station transmission method of the above described conventional mobile communication system, temporary data is required to be accumulated when a transmission format is converted in the transmission path interface unit 1210 of the radio base station 1200 and in the transmission path interface unit 1120 of the communication control station 1100. As a result, a conversion processing delay inevitably occurs during the turnaround processing. In the conventional inter-station transmission method, a turnaround time T is required as follows.

FIG. 24 illustrates the turnaround time required for the conventional mobile communication system shown in FIG. 20. The radio base station 1200 receives a MDC packet by an antenna. Then, as shown in (b) of FIG. 24, the radio base station 1200 detects and demodulates the reception MDC packet, and then converts the reception MDC packet into a digital baseband signal. The radio base station 1200 retains the signal during a time Tcu which is a difference between a transmission path delay time $\tau du$ of an uplink inter-station transmission path 1400 and a predetermined maximum transmission path delay time $\tau 0$ allocated to the system, and then transmits the signal to the uplink inter-station transmission path 1400. In other words, as shown in (a) and (b) of FIG. 24, the radio base station 1200 transmits MDC packet data which results from processing the reception MDC packet, to the uplink inter-station transmission path 1400, with a timing which is delayed from a reception time of the MDC packet at the antenna by a total of a reception processing delay RXd and a transmission path delay adjustment value Tcu.

Thereafter, as shown in (c) of FIG. 24, the MDC packet data is inputted to the communication control station 1100 with a timing delayed by a time $\tau du$, which corresponds to the length of the uplink inter-station transmission path 1400. The communication control station 1100 processes the MDC packet data inputted from the radio base station 1200 to extract MDC information data, and determines, based on error information contained in the packet, whether an error is present in the data. If it is determined that an error is not present, the communication control station 1100 retains the MDC information data, and generates an ACKC packet containing ACK information (i.e., ACKC packet in which AK bit of a reception confirmation information field AI is set to "1") indicating that the reception has been performed properly. If it is determined that an error is present, the communication control station 1100 generates an ACKC packet containing NACK information (i.e., ACKC packet in which AK bit of the reception confirmation information field AI is set to "0") indicating that the reception has not been performed properly. The generated ACKC packet is transmitted on a downlink inter-station transmission path 1400. As shown in (c) and (d) of FIG. 24, the communication control station 1100 transmits the ACKC packet data on the downlink inter-station transmission path 1400 with a timing delayed from a reception time of the MDC packet data by a time Tb (hereinafter, referred to as a communication control station processing delay), which is required for processing the MDC packet data and generating the ACKC packet in the communication control station 1100.

Thereafter, as shown in (e) of FIG. 24, the ACKC packet data is inputted to the radio base station 1200 with a timing delayed by a time $\tau dd$, which corresponds to the length of the downlink inter-station transmission path 1400. As shown in (f) of FIG. 24, the radio base station 1200 retains the ACKC packet data during a time Tcd, which is a difference between a transmission path delay time $\tau dd$ of the downlink inter-station transmission path 1400 and the predetermined maximum transmission path delay time $\tau 0$ allocated to the system, and then generates a modulation signal by modulating the ACKC packet data with a predetermined modulation method. The modulation signal is converted into a predetermined radio signal, and then outputted from the antenna. As shown in (e) and (f) of FIG. 24, the radio base station 1200 transmits an ACKC packet signal from the antenna with a timing which is delayed from an input time of the ACKC packet data by a total of a transmission process delay TXd and a transmission path delay adjustment value Tcd.

The turnaround time T is represented by the following equation (1).

$$T = RXd + Tcu + \tau du + Tb + \tau dd + TXd + Tcd \quad (1)$$

In general, a phase relation between data inputted from the inter-station transmission path 1400 to the communication control station 1100 and a data extracting clock in the communication control station 1100 fluctuates due to, for example, data distortion, and a frequency error between a data transmission clock in the communication control station 1100 for transmitting data to the inter-station transmission path 1400 and the data extracting clock in the radio base station 1200. Also, a phase relation between data inputted from the inter-station transmission path 1400 to the radio base station 1200 and a data extracting clock in the radio base station 1200 fluctuates due to, for example, data distortion, and a frequency error between the data transmission clock in the radio base station 1200 for transmitting data to the inter-station transmission path 1400 and the data extracting clock in the communication control station 1100. Accordingly, actual uplink/downlink transmission path delay times are likely to be different from values obtained when the transmission path delay times are measured. Hence, an actual uplink transmission path delay time Tdu has an error with respect to the uplink transmission path delay value τdu which is measured and obtained in advance, the actual uplink transmission path delay time Tdu being a time period from when the MDC packet data is inputted into the communication control station 1100 and the radio base station 1200 via the uplink inter-station transmission path 1400 until when the MDC packet data is extracted. Also, an actual downlink transmission path delay time Tdd has an error with respect to the downlink transmission path delay value τdd which is measured and obtained in advance, the actual downlink transmission path delay time Tdd being a time period from when the ACKC packet data is inputted into the communication control station 1100 and the radio base station 1200 via the downlink inter-station transmission path 1400 until when the ACKC packet data is extracted. Here, the errors are defined as an uplink delay adjustment error ΔTu and a downlink delay adjustment error ΔTd, and the errors are represented by the following equations (2) and (3).

$$|Tdu-\tau du|=\Delta Tu \quad (2)$$

$$|Tdd-\tau dd|=\Delta Td \quad (3)$$

The above described uplink/downlink transmission path delay adjustment values Tcu/Tcd are represented by the following equations (4) and (5).

$$Tcu=\tau 0-\tau du \quad (4)$$

$$Tcd=\tau 0-\tau dd \quad (5)$$

Hence, the following equation (6) representing an actual turnaround time T is derived from the above equations (1) to (5).

$$RXd+TXd+Tb+2\tau 0-\Delta Tu-\Delta Td \leq T \leq RXd+TXd+Tb+2\tau 0+\Delta Tu+\Delta Td \quad (6)$$

According to the ARIB STD-T75, which is a standard of the DSRC system, the turnaround time T is represented by the following equation (7).

$$t3-\Delta Tabs \leq T \leq t3+\Delta Tabs \quad (7)$$

Here, ΔTabs is set as less than 5 μs by a permissible deviation of a signal transmission time. Therefore, a condition of the following equation (8), which represents the maximum transmission path delay time τ0 allocated to a system and is derived from the equations (6) and (7), is required to be satisfied.

$$2\tau 0 \leq t3+\Delta Tabs-(RXd+TXd+Tb+\Delta Tu+\Delta Td) \quad (8)$$

As is clear from the above equation (8), in order to increase inter-station transmission distance by extending, within the predetermined turnaround time T, a time that can be allocated for the transmission path delay of the inter-station transmission path as much as possible, it is necessary to minimize the reception processing delay RXd, the transmission processing delay TXd, the communication control station processing delay Tb, the uplink delay adjustment error ΔTu and the downlink delay adjustment error ΔTd. However, as described above, in the conventional inter-station transmission method, the conversion processing delay is inevitably added to the TXd, RXd and Tb of the turnaround processing. For this reason, the conventional inter-station transmission method is not suitable for when the inter-station transmission distance is required to be extended while a system in which the turnaround time is set as the predetermined value T is used.

An object of the present invention is to provide a new inter-station transmission method, in which the time to be allocated for the transmission path delay of the inter-station transmission path is extended, as compared with the conventional method, within the predetermined turnaround time such that the inter-station transmission distance is increased as much as possible, and to provide a device using the method. Another object of the present invention is to provide a radio base station monitoring method for regularly monitoring a radio base station from a communication control station by using the new inter-station transmission method without affecting the turnaround time.

Solution to the Problems

The present invention is directed to a mobile communication system comprising a mobile station and a base station which is operable to return to the mobile station, by means of a TDMA system, a response packet in response to a packet received from the mobile station, within a same time slot as that used for receiving the packet, and also directed to an inter-station transmission method used in the mobile communication system. In order to achieve the above objects, the base station used in the mobile communication system and the inter-station transmission method of the present invention includes the following component elements, and performs distinctive processes.

The base station includes: at least one radio base station operable to demodulate an uplink packet signal received from the mobile station and extract uplink transmission data, and to modulate downlink transmission data to be transmitted to the mobile station and generate a downlink packet signal; a communication control station operable to receive the uplink transmission data from the at least one radio base station, generate downlink transmission data corresponding to the uplink transmission data and transmit the downlink transmission data to the at least one radio base station; and at least one inter-station transmission path which establishes a wired connection between the at least one radio base station and the communication control station. The base station transmits, from the at least one radio base station to the communication control station, the uplink transmission data in a TDMA frame format which is used for a radio link between the at least one radio base station and the mobile station, and in the communication control station, the base station processes the uplink transmission data, which is received from the at least one radio base station, in the TDMA frame format. The base station may also transmit, from the communication control station to the at least one radio base station, the downlink transmission data in the TDMA frame format, and in the at least one radio base station, the base station may process the downlink transmission data, which is received from the communication control station, in the TDMA frame format.

Preferably, the downlink transmission data is transmitted, from the communication control station, in accordance with a predetermined communication control station transmission clock, and in the at least one radio base station, a radio base station reception clock synchronized with the communication control station transmission clock is reproduced from the downlink transmission data received from the communication control station, and the downlink transmission data is processed by using the radio base station reception clock. At this point, in the communication control station, it is efficient to transmit, in a period which is within the TDMA frame and in which a channel data packet to be transmitted is not present, the downlink transmission data into which dummy data for reproducing the radio base station reception clock is inserted. Typically, the radio base station reception clock is reproduced in the at least one radio base station by using PLL control.

Preferably, in the communication control station, a communication control station reception clock, which results from multiplying or dividing the communication control station transmission clock by n (n is a natural number), is used to receive the uplink transmission data. In the at least one radio base station, a radio base station operation clock is generated by multiplying the radio base station reception clock by m (m is an integer greater than 1). The uplink transmission data is transmitted by using a radio base station transmission clock, which results from multiplying or dividing the radio base station operation clock by k (k is a natural number) and has a frequency synchronized with the communication control station reception clock, and a phase difference, which occurs according to the length of the at least one inter-station transmission path, between the radio base station transmission clock and the communication control station reception clock is adjusted by a clock unit of the radio base station operation clock.

When a response signal is transmitted from the communication control station, only a payload portion of the response packet may be transmitted to the at least one radio base station, and, in the at least one radio base station, transmission of the response packet may be begun with a predetermined timing, by using header information previously retained, without waiting for an arrival of the payload portion from the communication control station.

In the case where a plurality of radio base stations are connected to the communication control station respectively via the plurality of inter-station transmission paths, it is preferable that each of the plurality of radio base stations adjusts, by the clock unit of the radio base station operation clock, a delay time difference, which occurs according to the length of the inter-station transmission path, between a downlink transmission path delay and a predetermined transmission path delay.

If a difference between lengths of the inter-station transmission paths presents a problem, in the communication control station a plurality of pieces of uplink transmission data, which are respectively outputted from the plurality of radio base stations and correspond to a same packet received from the mobile station, may be received in a predetermined slot, and a reception timing of uplink transmission data is detected, the uplink transmission data corresponding to the packet having been first received, and then a selection process may be performed only on uplink transmission data which has been received before a predetermined period of time has passed after the reception timing. Note that, the predetermined period of time may be set according to a length of an area covered by the plurality of radio base stations or a length of a longest inter-station transmission path among the plurality of inter-station transmission paths.

The present invention is also directed to the radio base station monitoring method used in the mobile communication system. In the radio base station monitoring method, at least one radio base station of the base station generates monitoring data for notifying a state of the radio base station to the communication control station, and time division multiplexes the monitoring data into the uplink transmission data with a slot timing which is only allocated to a downlink, and then transmits, to the communication control station, the uplink transmission data and monitoring data in the TDMA frame format which is used for the radio link between the radio base station and the mobile station. Then, the communication control station processes uplink transmission data, in the TDMA frame format, which is received from the at least one radio base station, and monitors a state of the at least one radio base station by using the monitoring data.

EFFECT OF THE INVENTION

As described above, according to the present invention, the radio base station reproduces a clock DCLK synchronized with a BSU transmission clock DCLK, the BSU transmission clock DCLK being used when transmitting downlink transmission data from the communication control station. Based on the reproduced DCLK, the radio base station processes the downlink transmission data. Since this clock synchronization eliminates the necessity of data format conversion between the communication control station and the radio base station, a buffer such as an FIFO for accumulating transmission data in preparation for the conversion is no longer necessary. Consequently, a delay time caused by the buffer in the conventional process is eliminated. This makes it possible to reduce the turnaround time of the mobile communication system. When the present invention is applied to the dedicated short-range communications (DSRC), in which the turnaround time is fixed, a physical distance between the communication control station and the radio base station can be increased by a distance that corresponds to the eliminated delay time.

The TDMA frame transmission format of the DSRC system, which is used for the radio link, is also used for the inter-station transmission path without any changes. This makes it possible to regularly transmit the monitoring data from the radio base station to the communication control station in a TDMA frame period by using a timing of the control slot, in which there is no reception signal from the mobile station.

DETAILED DESCRIPTION OF THE INVENTION

An inter-station transmission method of the present invention is applicable to various communication systems that employ a TDMA system, in which a response signal (ACK/NACK) notifying whether or not a signal has been properly received is required to be returned from a base station to a mobile station within a short period of time which is within the same time slot as that used for receiving the signal.

Hereinafter, the present invention will be described with an exemplary case where the present invention is applied to a dedicated short-range communication (DSRC) system complying with ARIB STD-T75, which is one of the TDMA systems.

First Embodiment

Figure 1:
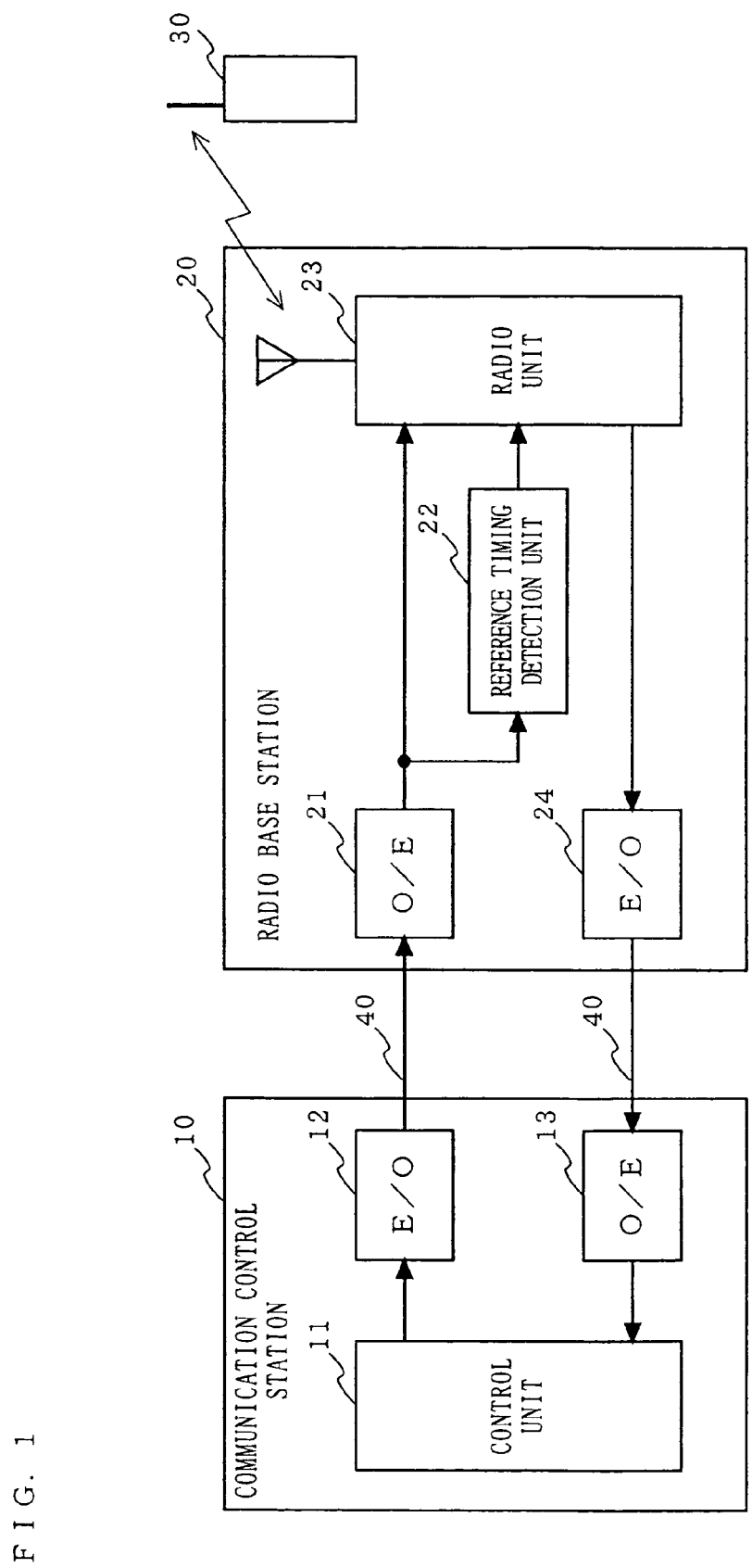
FIG. 1 shows a structure of a mobile communication system according to the first embodiment of the present invention.

FIG. 1 shows a structure of a mobile communication system according to a first embodiment of the present invention.

In FIG. 1, the mobile communication system according to the first embodiment comprises a base station including a communication control station 10 and a radio base station 20, and a mobile station 30. The communication control station 10 and the radio base station 20 are connected by an uplink inter-station transmission path 40 and a downlink inter-station transmission path 40. The communication control station 10 includes a control unit 11, a line driver 12 and a line receiver 13. The radio base station 20 includes a line receiver 21, a reference timing detection unit 22, a radio unit 23 and a line driver 24. In this embodiment, an exemplary case is shown where electrical-optical converters (E/O) for converting an electrical signal into an optical signal are used as the line drivers 12 and 24, optical-electrical converters (O/E) for converting an optical signal into an electrical signal are used as the line receivers 13 and 21, and fiber optics are used as the inter-station transmission paths 40.

In the present invention, in order to eliminate delay times TRd1 to TRd4 (refer to FIG. 7A), which occur when a format conversion of transmission data is performed, a clock used in the communication control station 10 and a clock used in the radio base station 20 are synchronized, and a timing of data transmission is controlled.

Hereinafter, the inter-station transmission method used in the mobile communication system according to the above first embodiment will be described in detail with reference to FIGS. 2 to 8.

Figure 2:
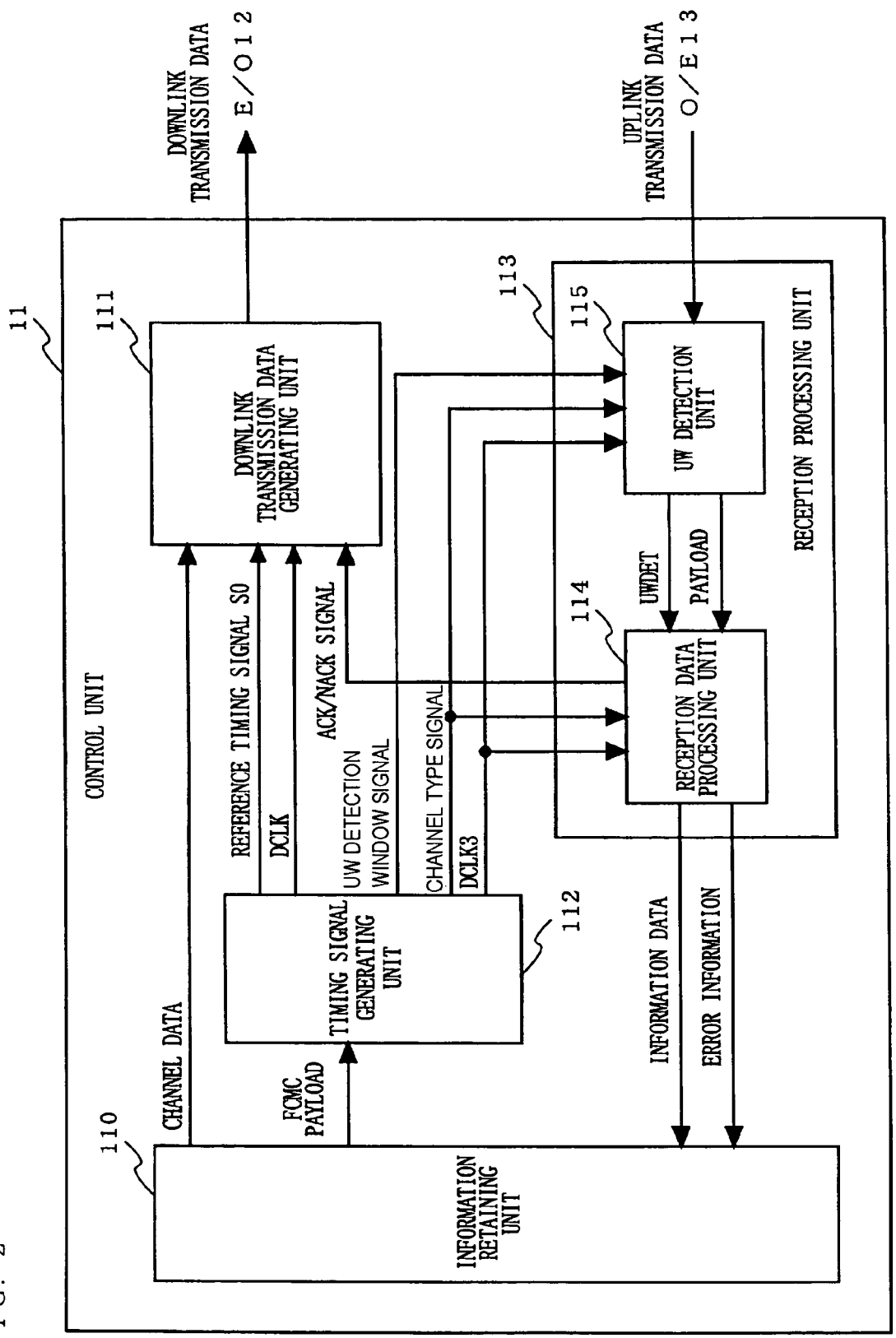
FIG. 2 shows a detailed exemplary structure of a control unit 11.
Figure 3:
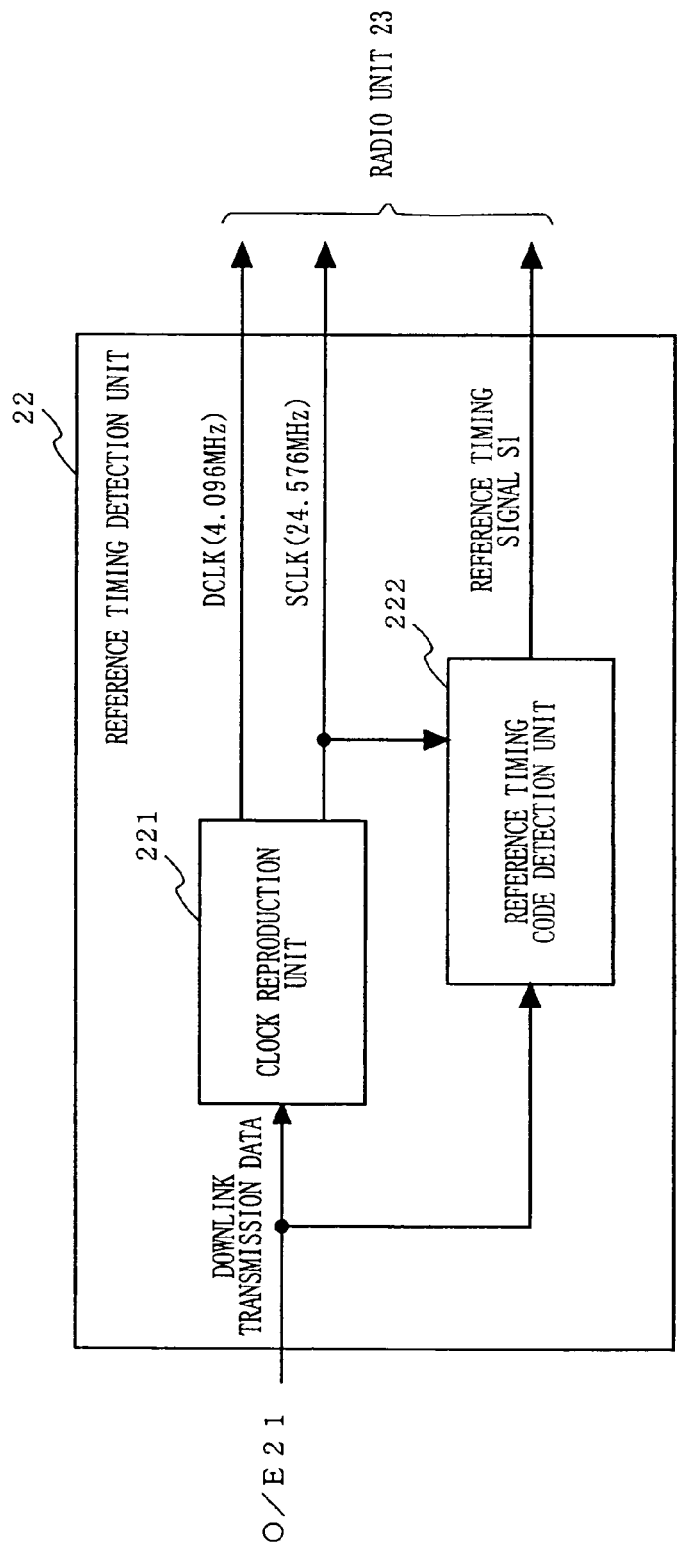
FIG. 3 shows a detailed exemplary structure of a reference timing detection unit 22.
Figure 4:
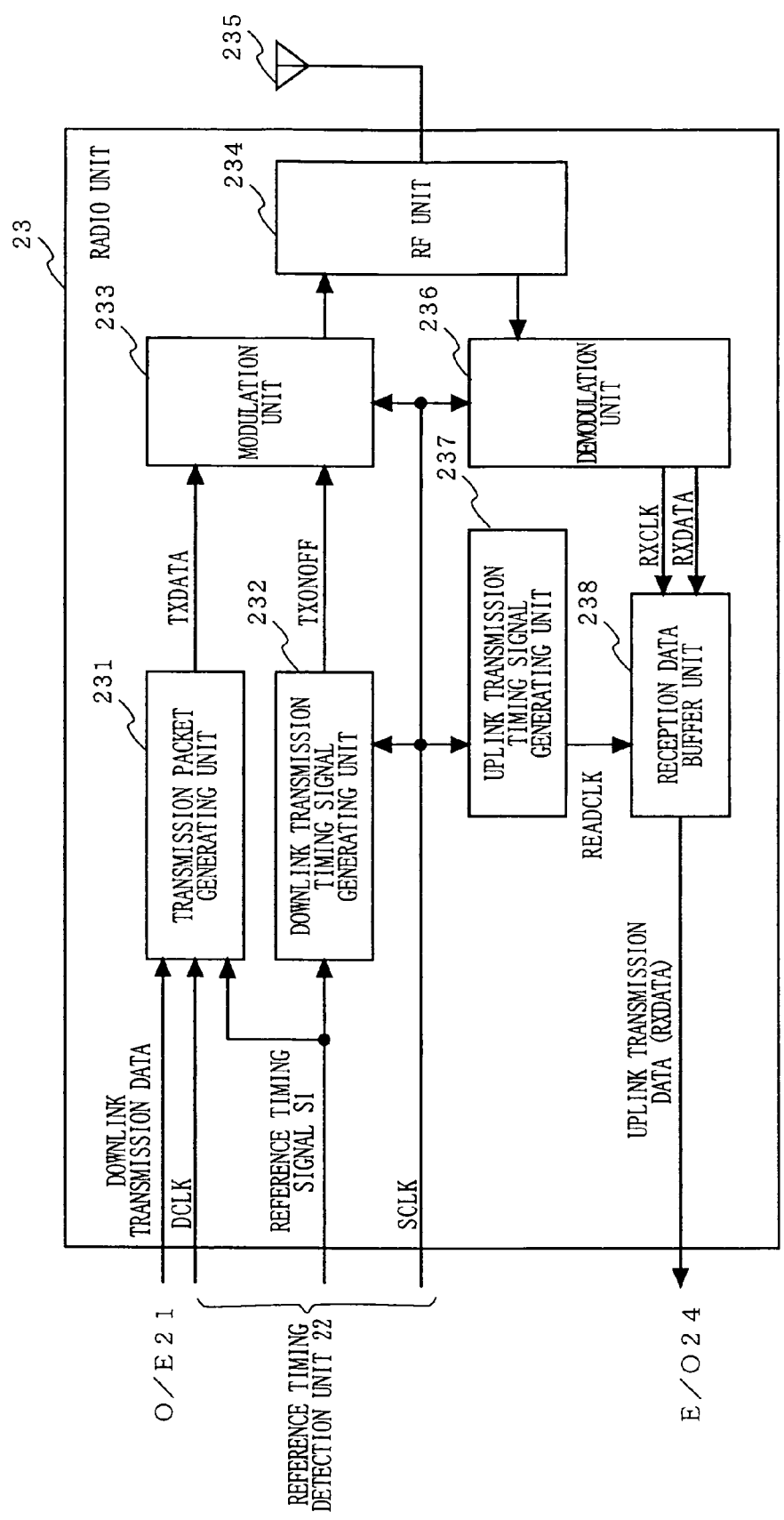
FIG. 4 shows a detailed exemplary structure of a radio unit 23.
Figure 5:
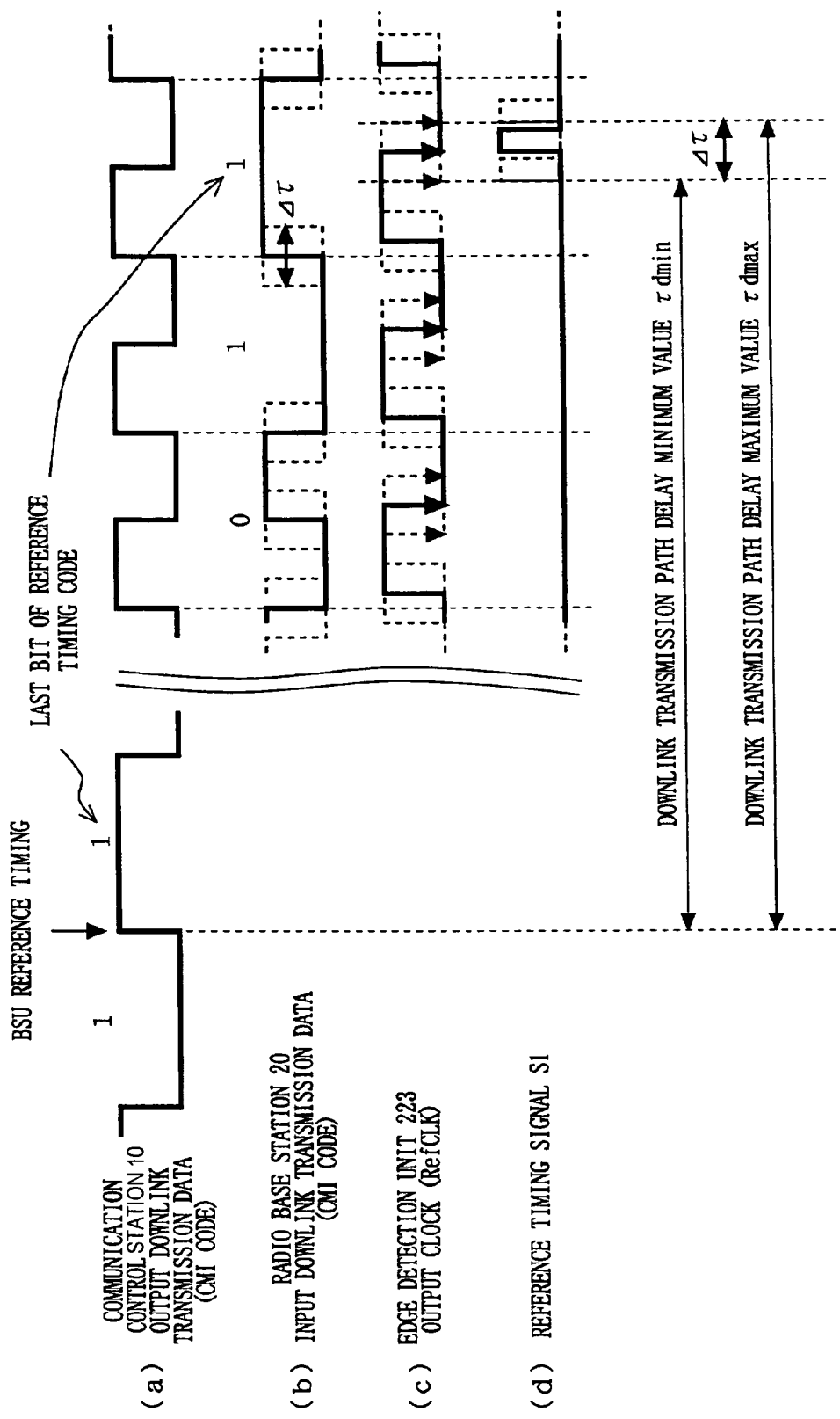
FIG. 5 illustrates an effect to a reproduction clock in the case where jitter occurs in downlink transmission data.

First, schematic structures of the control unit 11, the reference timing detection unit 22 and the radio unit 23 shown in FIG. 1 will be described. FIG. 2 shows a detailed structure of the control unit 11. FIG. 3 shows a detailed structure of the reference timing detection unit 22. FIG. 4 shows a detailed structure of the radio unit 23.

As shown in FIG. 2, the control unit 11 includes an information retaining unit 110, a downlink transmission data generating unit 111, a timing signal generating unit 112 and a reception processing unit 113. The reception processing unit 113 includes a reception data processing unit 114 and a UW detection unit 115. The UW detection unit 115 detects a unique word (UW) such as a FCMC or a MDC contained in uplink transmission data received from the radio base station 20, and extracts a payload portion of the uplink transmission data. The reception data processing unit 114 performs, on the payload extracted by the UW detection unit 115, predetermined processing, for example, descrambling, error detection and error correction, and obtains information data and error information. The information retaining unit 110 retains various information required for communications. The timing signal generating unit 112 generates signals having various timings which are used in the communication control station 10 and the radio base station 20. The downlink transmission data generating unit 111 generates downlink transmission data containing a timing signal generated in the timing signal generating unit 112 and a downlink payload outputted from the information retaining unit 110, and then transmits the downlink transmission data to the radio base station 20.

As shown in FIG. 3, the reference timing detection unit 22 includes a clock reproduction unit 221 and a reference timing code detection unit 222. The clock reproduction unit 221 receives the downlink transmission data from the communication control station 10, and reproduces a clock required for signal processing in the radio base station 20. The reference timing code detection unit 222 uses the clock reproduced in the clock reproduction unit 221 to detect particular information contained in the downlink transmission data, and outputs a reference timing signal giving a reference timing of processing by the radio base station 20.

As shown in FIG. 4, the radio unit 23 includes a transmission packet generating unit 231, a downlink transmission timing signal generating unit 232, a modulation unit 233, an RF unit 234, an antenna 235, a demodulation unit 236, an uplink transmission timing signal generating unit 237 and a reception data buffer unit 238. The transmission packet generating unit 231 generates transmission packet data by using the downlink transmission data received from the communication control station 10. The downlink transmission timing signal generating unit 232 controls the modulation unit 233 with a timing detected in the reference timing detection unit 22. According to the control by the downlink transmission timing signal generating unit 232, the modulation unit 233 generates a modulation signal from the transmission packet data, which has been generated in the transmission packet generating unit 231, and then transmits the modulation signal to the RF unit 234. The RF unit 234 transmits and receives packet data to and from the mobile station 30 via the antenna 235, respectively. The demodulation unit 236 demodulates the packet data received in the RF unit 234. The reception data buffer unit 238 temporarily stores the reception packet data demodulated in the demodulation unit 236. The uplink transmission timing signal generating unit 237 transmits, via the line driver 24, the data stored in the reception data buffer unit 238 to the communication control station 10 with a predetermined timing.

Next, a procedure for clock synchronization will be described which is performed between the communication control station 10 and the radio base station 20 of the above structure. In the control unit 11, the timing signal generating unit 112 generates a base clock SCLK of 24.576 MHz, which is used for each process performed by the control unit 11, and a BSU transmission clock DCLK of 4.096 MHz, which is used when downlink transmission data is transmitted. The BSU transmission clock DCLK is a signal whose frequency is $\frac{1}{6}$ of that of the base clock SCLK. The timing signal generating unit 112 generates a reference timing signal S0, in accordance which a transmitting operation and a receiving operation are performed in the communication control station 10, and outputs the signal S0 in a TDMA frame period. The timing signal generating unit 112 takes in FCMC payload data from the information retaining unit 110, and analyzes the FCMC payload data to recognize a slot structure of a TDMA frame, thereby recognizing the TDMA frame period. Based on the recognition, the timing signal generating unit 112 outputs, to the reception processing unit 113, a channel type signal indicating channel information that is contained in uplink transmission data to be inputted at this point. According to the recognized frame period and slot structure, the timing signal generating unit 112 determines, based on the reference timing signal S0, a timing at which a unique word such as a MDC or an ACKC contained in the uplink transmission data is possibly inputted, and outputs, to the reception processing unit 113, a UW window detection signal indicating the timing.

The downlink transmission data generating unit 111 uses as a reference point an input time of the reference timing signal S0, which is received from the timing signal generating unit 112, and reads out FCMC frame data from the information retaining unit 110 at a predetermined time to analyze the FCMC payload. When it is determined based on the analysis of the FCMC payload that there is a MDC packet to be transmitted in a MDS slot following a FCMS slot, the downlink transmission data generating unit 111 uses the input time of the reference timing signal S0 as a reference point, and sequentially reads payload data of each MDC packet from the information retaining unit 110 with a predetermined timing.

On the other hand, when receiving, from the reception processing unit 113, an ACK/NACK signal indicating whether or not an uplink MDC packet has been received properly, the downlink transmission data generating unit 111 uses the input time of the reference timing signal S0 as a reference point, and generates payload data of an ACKC packet (i.e., a portion generated by removing a preamble and a unique word from the ACKC packet) with a predetermined timing. After the payload data (i.e., channel data) is multiplexed with, for example, frequency control information for controlling transmission and reception frequencies of the radio base station 20, the payload data is transmitted as downlink transmission data to the inter-station transmission path 40 via the line driver 12.

The downlink transmission data generating unit 111 generates a clock of 8.192 MHZ by doubling the BSU transmission clock DCLK, and converts the downlink transmission data, which has been multiplexed, into a CMI code by using the clock, and then transmits the resultant data. In a period where channel data packet to be transmitted is not inputted, the downlink transmission data generating unit 111 converts a zero-level signal of an NRZ code into a CMI code, and transmits the resultant signal. In such a period where there is no packet input, 01 pattern of the NRZ code equivalent to 8.192 Mbps is repeatedly transmitted as dummy data.

In the radio base station 20, the clock reproduction unit 221 of the reference timing detection unit 22 detects an edge of the downlink transmission data received from the communication control station 10, and reproduces the BSU transmission clock DCLK of 4.096 MHz and the base clock SCLK of 24.576 MHZ, which is generated by sextupling the DCLK. The reference timing code detection unit 222 uses the base clock SCLK as an operation clock to detect a reference timing detection code contained in the downlink transmission data and extracts a reference timing signal S1.

Ideally, just detecting the edge of the downlink transmission data should allow precise reproduction of the BSU transmission clock DCLK of 4.096 MHz and the base clock SCLK of 24.576 MHz. However, in practice, jitter occurs in the downlink transmission data received in the radio base station 20 due to, for example, noise on the inter-station transmission path 40 or a code pattern (refer to (b) of FIG. 5). Consequently, with reference to (c) of FIG. 5, a clock that is reproduced based on the edge detection of the downlink transmission data also jitters with a width of $\Delta\tau$. Therefore, if the clock, which jitters with the width of $\Delta\tau$, is used to detect a reference timing and to manage timing within the radio base station 20, a transmission path delay and a transmission timing fluctuate with the width of $\Delta\tau$ (refer to (d) of FIG. 5).

Figure 6:
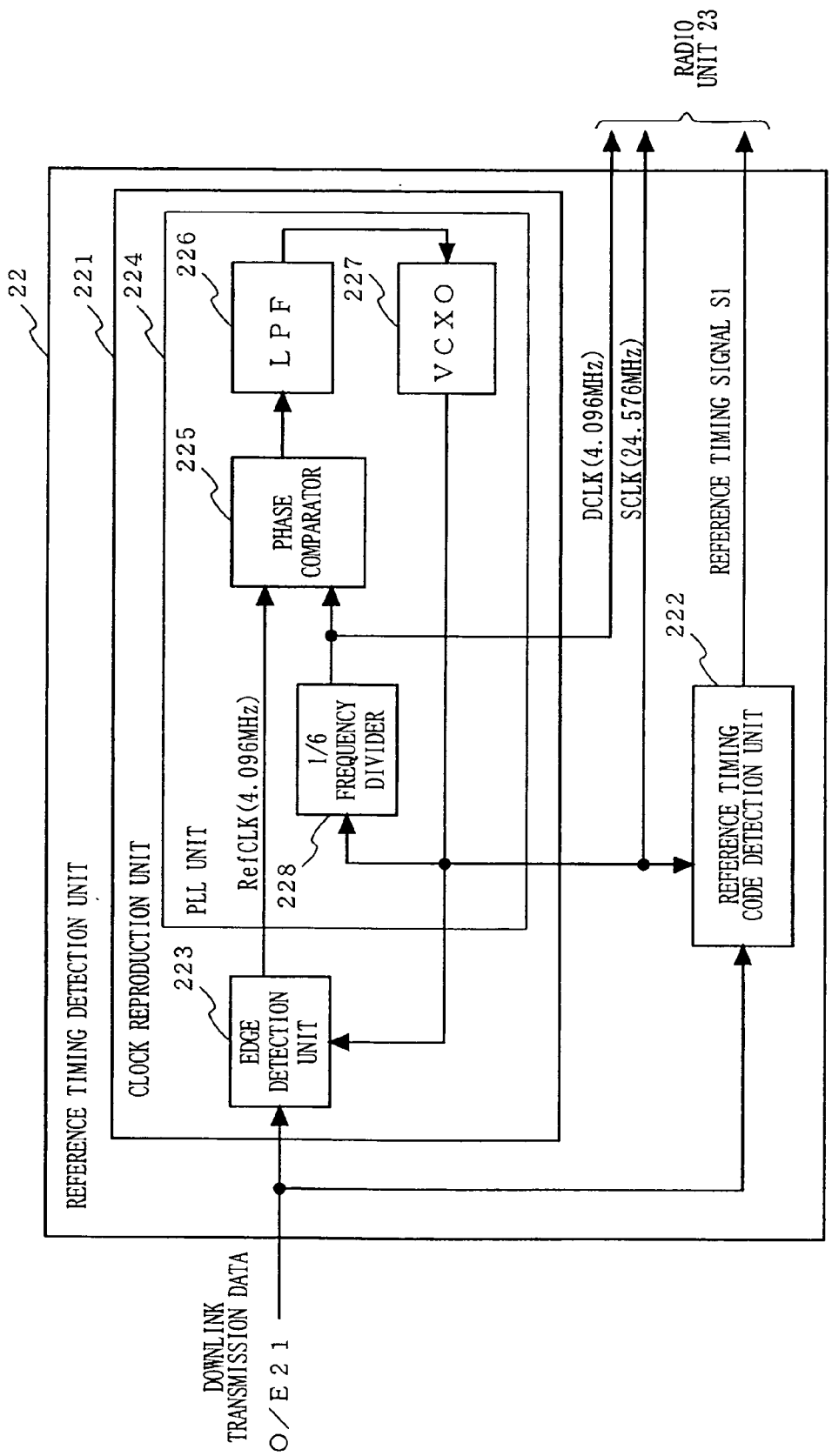
FIG. 6 shows a detailed exemplary structure of a clock reproduction unit 221.

In order to solve this jitter-related problem, it is preferable to use the clock reproduction unit 221 having a PLL (Phase Lock Loop) control function as shown in FIG. 6. The clock reproduction unit 221 of FIG. 6 includes an edge detection unit 223 and a PLL unit 224. The PLL unit 224 has a phase comparator 225, a LPF (Low-Pass Filter) 226, a VCXO (voltage-controlled oscillator) 227 and a $\frac{1}{6}$ frequency divider 228. The edge detection unit 223 detects an edge of the downlink transmission data, and extracts a reference clock RefCLK of 4.096 MHz. The phase comparator 225 compares the reference clock RefCLK and an output clock DCLK (4.096 MHz) of the $\frac{1}{6}$ frequency divider 228. The LPF 226 converts an output signal of the phase comparator 225 into a smoothed voltage signal. In response to the voltage signal outputted by the LPF 226, the VCXO 227 generates the base clock SCLK of 24.576 MHz, which synchronizes the reference clock RefCLK and is sextuple thereof. This base clock SCLK is fed back into the ⅙ frequency divider 228. The base clock SCLK is also used as an operation clock for extracting a clock in the edge detection unit 223.

In the radio unit 23, the downlink transmission timing signal generating unit 232 uses an input time of the reference timing signal S1 as a reference point, and determines a head point of the TDMA frame. Thus, clock synchronization is performed between the communication control station 10 and the radio base station 20.

Figure 7A:
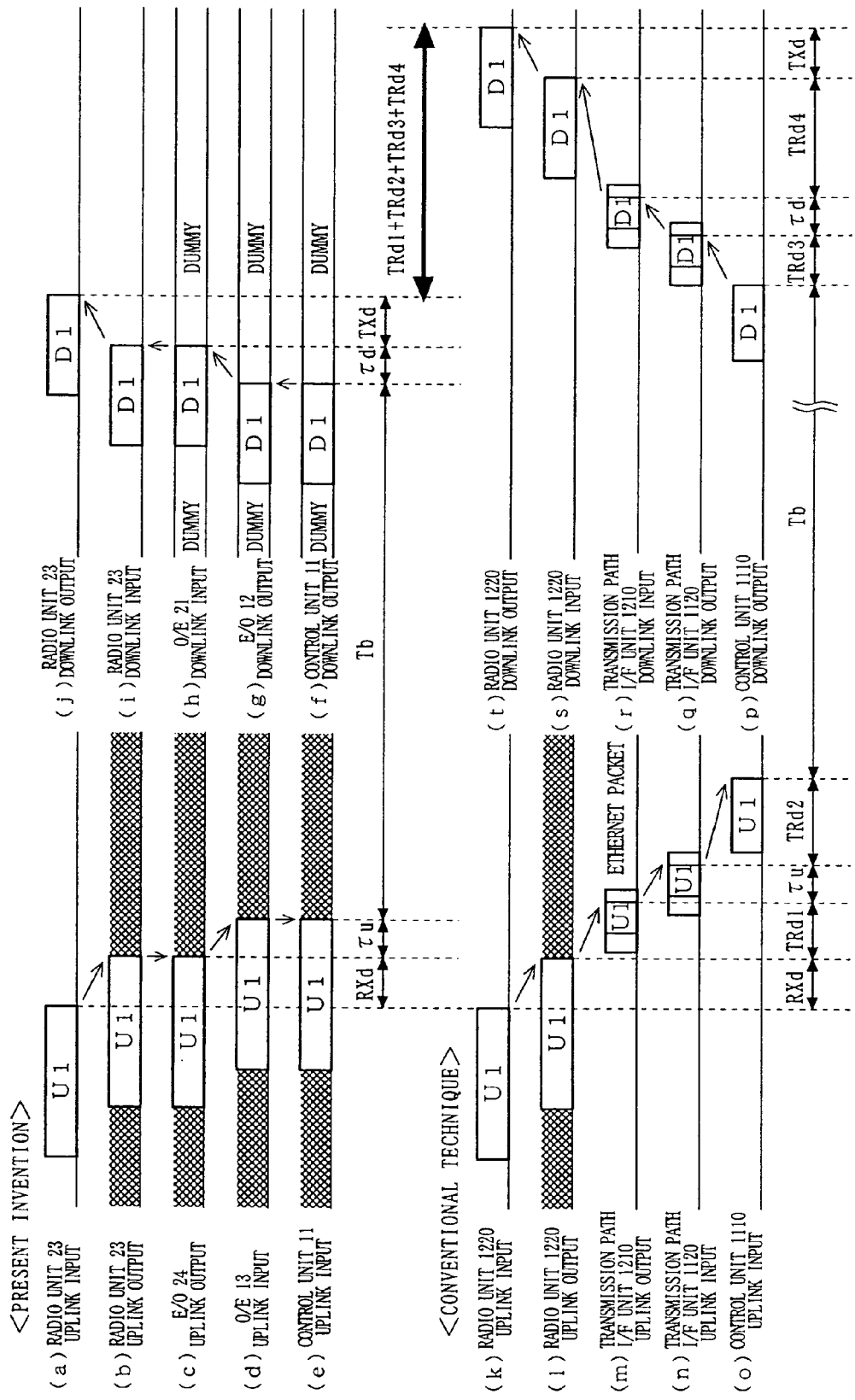
FIG. 7A illustrates a sequence of data transmission.

Next, it will be described that the present invention makes it possible to shorten a turnaround time compared with a conventional method, showing an exemplary sequential process in which, while clock synchronization is performed as above, uplink transmission data (MDC packet) is transmitted from the mobile station 30 to the communication control station 10 via the radio base station 20, and, in response thereto, downlink transmission data (ACKC packet) is transmitted from the communication control station 10 to the mobile station 30 via the radio base station 20. FIG. 7A illustrates a sequence of data transmission. Note that, hatched areas in FIG. 7A indicate areas where irrelevant demodulation data is present.

First, the RF unit 234 of the radio base station 20 receives a radio packet from the mobile station 30 via the antenna 235. The RF unit 234 downconverts a signal having a predetermined uplink frequency which complies with ARIB STD-T75, thereby generating an analog baseband signal. The demodulation unit 236 converts the analog baseband signal generated in the RF unit 234 into a digital baseband signal. The demodulation unit 236 performs differential detection on the digital baseband signal to obtain a detection data string, and then outputs the detection data string as reception data RXDATA. The reception data RXDATA is inputted, together with reception data clock RXCLK reproduced from the baseband signal, into the reception data buffer unit 238.

Based on the base clock SCLK reproduced in the reference timing detection unit 22, the uplink transmission timing signal generating unit 237 generates a transmission timing signal for transmitting the uplink transmission data, and supplies the signal to the reception data buffer unit 238 as a readout clock READCLK. The reception data buffer unit 238 reads out, while the readout clock READCLK is supplied from the uplink transmission timing signal generating unit 237, the reception data RXDATA by using the reception data clock RXCLCK, and outputs the reception data RXDATA to the line driver 24. A delay time that occurs during this process is a time RXd (from (a) to (b) of FIG. 7A).

In the line driver 24, the reception data RXDATA is converted from an electrical signal to an optical signal, and then is transmitted as uplink transmission data U1 to the line receiver 13 of the communication control station 10 via the inter-station transmission path 40. Since data format conversion is not performed in the line driver 24, a delay time due to the conversion does not occur (from (b) to (c) of FIG. 7A). In the line receiver 13 of the communication control station 10, the uplink transmission data U1 is again converted from the optical signal to the electrical signal. Since data format conversion is not performed in the line receiver 13 also, a delay time due to the conversion does not occur (from (d) to (e) of FIG. 7A). Thus, a delay time that occurs during this uplink transmission process is only a time τu (from (c) to (d) of FIG. 7A).

The reception processing unit 113 takes in the uplink transmission data U1 outputted from the line receiver 13 with a BSU reception clock DCLK3, whose rate is the same as a transmission rate of the uplink transmission data. The BSU reception clock DCLK 3 is generated by multiplying or dividing the BSU transmission clock. Based on the UW detection window signal, which indicates a UW detection valid period, and the channel type signal, the reception processing unit 113 detects a unique word such as a MDC from the uplink transmission data U1, and extracts a payload thereof. Then, the reception processing unit 113 performs, on the extracted payload, predetermined processing such as descrambling, error detection and error correction, and obtains information data by removing redundant components such as an error correction code and an error detection code from the payload. The obtained information data is outputted to the information retaining unit 110. The reception processing unit 113 outputs, to the downlink transmission data generating unit 111, an ACK signal or an NACK signal indicating whether or not the uplink transmission data has been received properly.

In response to the ACK/NACK signal received from the reception processing unit 113, the downlink transmission data generating unit 111 generates downlink transmission data D1 with a predetermined timing, according to the BSU transmission clock DCLK and the reference timing signal S0 both supplied by the timing signal generating unit 112. Then, the downlink transmission data generating unit 111 outputs the generated downlink transmission data D1 to the line driver 12. A delay time that occurs during this processing in the communication control station 10 is a time Tb (from (e) to (f) of FIG. 7A).

After being converted from an electrical signal to an optical signal in the line driver 12, the downlink transmission data D1 is transmitted to the line receiver 21 of the radio base station 20 via the inter-station transmission path 40. Since data format conversion is not performed in the line driver 12, a delay time due to the conversion does not occur (from (f) to (g) of FIG. 7A). In the line receiver 21 of the radio base station 20, the downlink transmission data D1 is again converted from the optical signal to the electrical signal. Since data format conversion is not performed in the line receiver 21 also, a delay time due to the conversion does not occur (from (h) to (i) of FIG. 7A). Thus, a delay time that occurs during the downlink transmission processing is only a time τd (from (g) to (h) of FIG. 7A).

The downlink transmission data D1 outputted from the line receiver 21 is inputted into the reference timing detection unit 22 and the radio unit 23. The reference timing detection unit 22 detects an edge portion of the dummy data, which has been added such that the transmission of the downlink transmission data D1 and the reproduction of a clock are performed stably, and reproduces the base clock SCLK and the BSU transmission clock DCLK. Then, the reference timing detection unit 22 extracts the reference timing signal S1 by using the reproduced base clock SCLK.

The downlink transmission timing signal generating unit 232 uses, as a reference, the input time of the reference timing signal S1, and generates, with a predetermined timing, a transmission control signal TXONOFF for controlling a timing of modulation performed by the modulation unit 233.

Based on the input time of the reference timing signal S1, the transmission packet generating unit 231 uses, as a reference point, an insertion point of a reference timing detection code within the TDMA frame, and extracts the downlink transmission data D1, which is present at a predetermined position. The transmission packet generating unit 231 performs predetermined processing (i.e., adding a preamble pattern and a unique word pattern, and data scrambling) on the downlink transmission data D1, and generates an ACKC packet. Then, the transmission packet generating unit 231 inputs the ACKC packet as transmission data TXDATA into the modulation unit 233.

In response to an input timing of the transmission control signal TXONOFF, the modulation unit 233 modulates, with QPSK system complying with ARIB STD-T75, the transmission data TXDATA inputted from the transmission packet generating unit 231, and outputs the resultant data to the RF unit 234.

Figure 8:
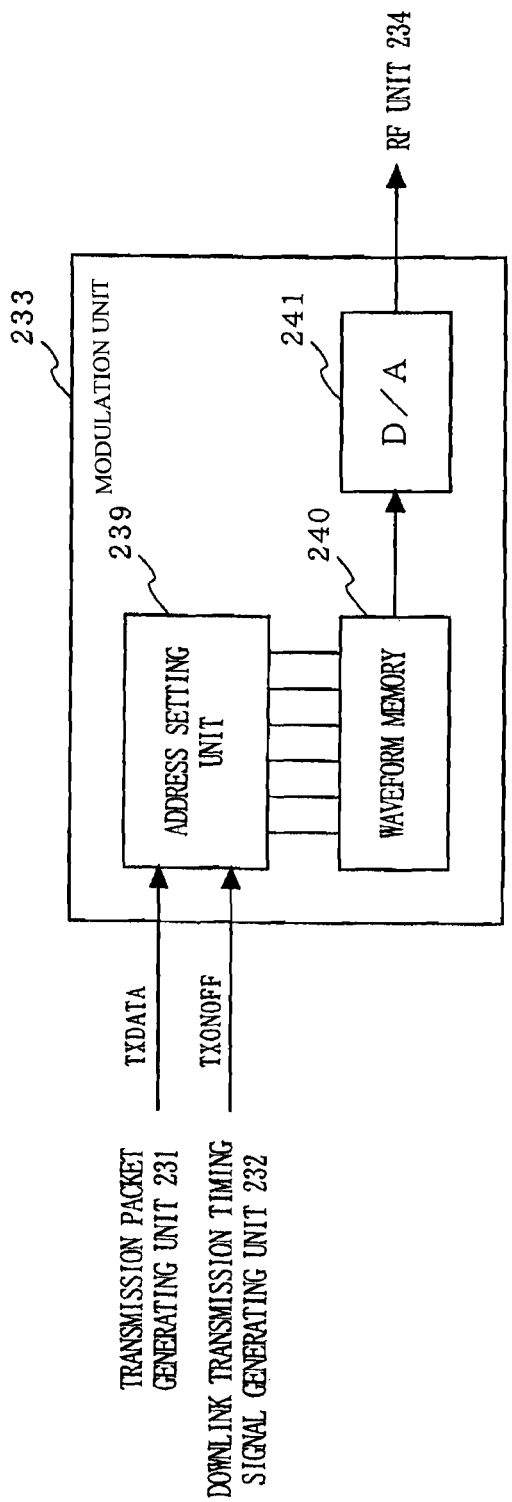
FIG. 8 shows a detailed exemplary structure of a modulation unit 233.

Typically, as shown in FIG. 8, the modulation unit 233 includes an address setting unit 239, a waveform memory 240 and a D/A converter 241. The address setting unit 239 supplies to an address input of the waveform memory 240 a transmission data string, which has been inputted corresponding to the input timing of the transmission control signal TXONOFF, as parallel data of k bit (k is a natural number). The waveform memory 240 outputs waveform data stored at an address of the supplied parallel data. The D/A converter 241 converts the waveform data outputted from the waveform memory 240 into an analog waveform, and outputs the analog waveform as a baseband waveform of a QPSK modulation signal.

After performing orthogonal modulation on the baseband waveform of the QPSK modulation signal, the RF unit 234 upconverts the baseband waveform into a radio signal having a predetermined downlink frequency which complies with ARIB STD-T75, and outputs the radio signal to the antenna 235. The antenna 235 transmits the radio signal inputted from the RF unit 234 to the mobile station 30 (i.e., a predetermined area).

As described above, in the mobile communication system and the inter-station transmission method according to the first embodiment of the present invention, the radio base station 20 reproduces a clock DCLK synchronized with the BSU transmission clock DCLK, the BSU transmission clock DCLK being used when the downlink transmission data is transmitted from the communication control station 10. Based on the reproduced DCLK, the radio base station 20 processes the downlink transmission data. Since this clock synchronization eliminates the necessity of data format conversion between the communication control station 10 and the radio base station 20, a buffer such as a FIFO for accumulating transmission data in preparation for the conversion is no longer necessary. Consequently, a delay time due to the format conversion by the buffer in the conventional process is eliminated, and thus the turnaround time of the mobile communication system is reduced. Therefore, when the present invention is applied to dedicated short-range communications (DSRC), in which the turnaround time is fixed, a time that can be allocated for a transmission delay of the inter-station transmission path 40 is extended by the eliminated amount of the delay time, and thus a physical distance between the communication control station and the radio base station can be increased.

If a PLL circuit is used for the clock reproduction unit, the jitter of the reproduction clock is prevented during a clock reproduction, and the fluctuation of the transmission path delay of the downlink transmission path caused by the jitter is prevented. This allows accurate adjustment of the transmission path delay of the downlink transmission path, and thus prevents the turnaround time from extending due to an error.

Figure 7B:
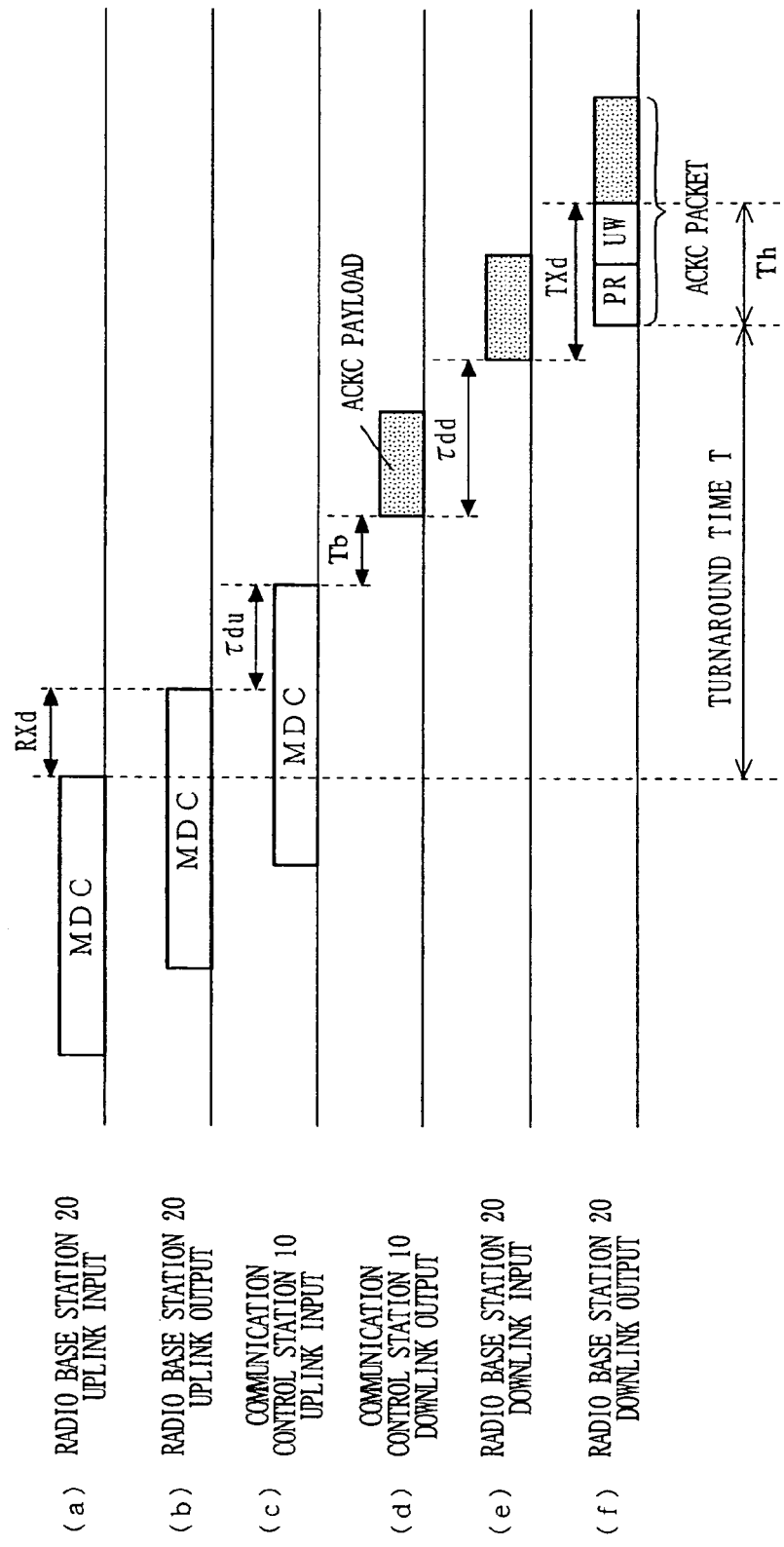
FIG. 7B illustrates that a permissible transmission path delay is increased by transmitting only a part of an ACKC packet that does not contain a preamble and a unique word.

In the present embodiment, as shown in FIG. 7B, the downlink transmission data D1, which is outputted into the inter-station transmission path 40, does not contain a preamble or a unique word of an ACKC. Unlike the present embodiment, in a general structure, the entire ACKC packet containing, for example, a preamble (PR) and a unique word (UW) is transmitted as downlink transmission data, and the transmission packet processing unit 231 just retains the packet and causes the modulation unit 233 to read the packet. However, as shown in FIG. 7B, the above structure in the present embodiment extends the time allocated for a transmission path delay of the inter-station transmission path by a time length Th, which is used for transmitting a header (i.e., preamble+ unique word) of the ACKC packet, thereby allowing a physical distance to be increased by just that much between the communication control station and the radio base station.

Second Embodiment

Figure 9:
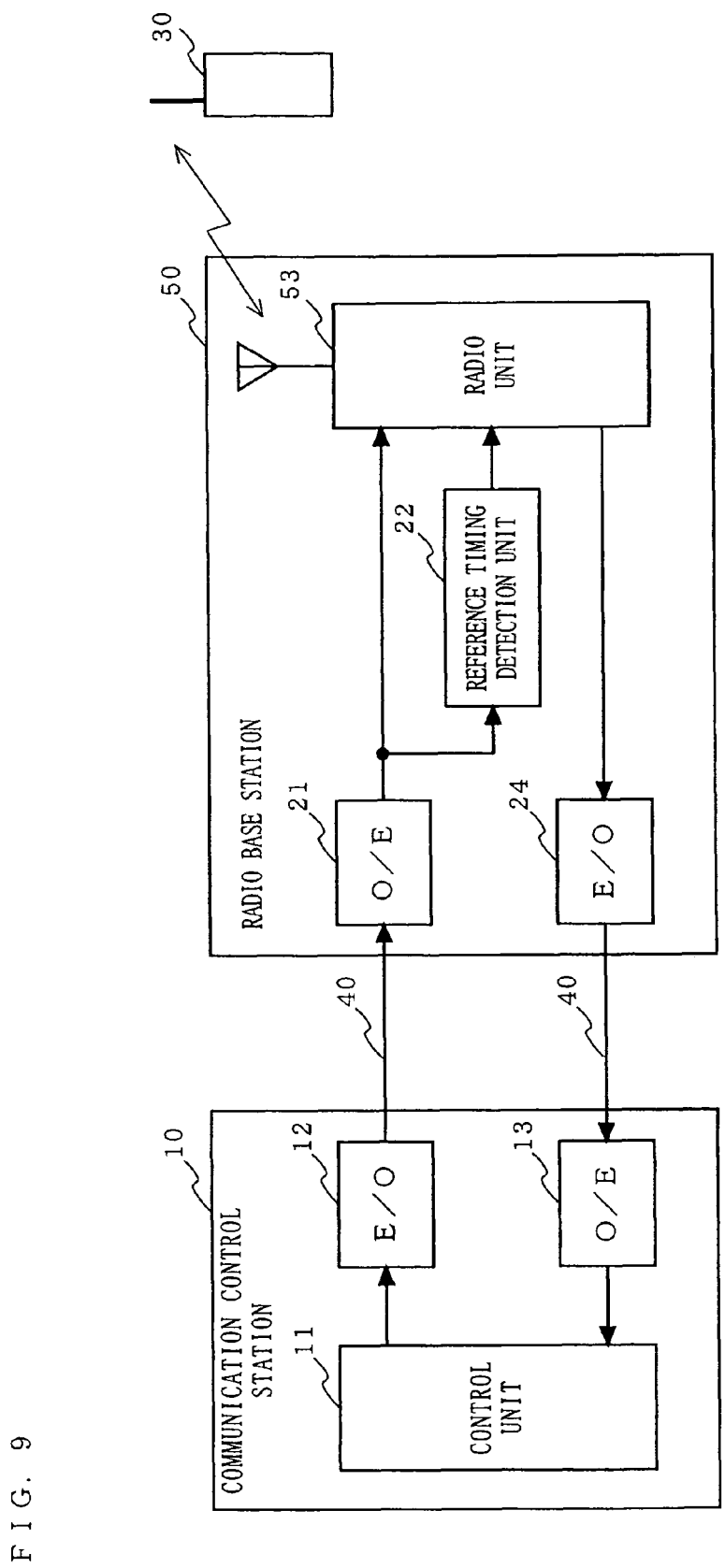
FIG. 9 shows a structure of a mobile communication system according to the second embodiment of the present invention.
Figure 10:
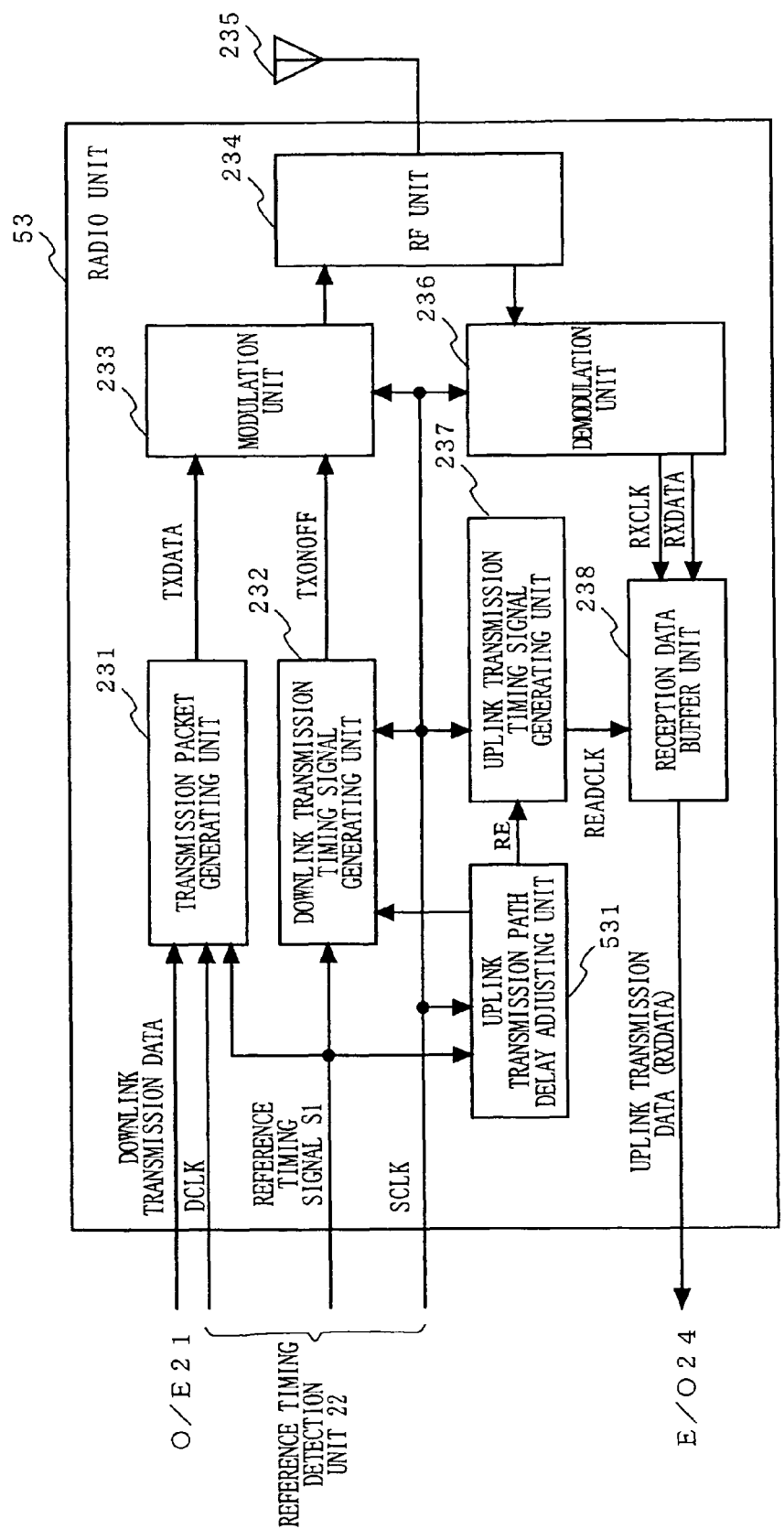
FIG. 10 shows a detailed exemplary structure of a radio unit 53.

FIG. 9 shows a structure of a mobile communication system according to a second embodiment of the present invention. FIG. 10 shows a detailed structure of a radio unit 53. In FIG. 9, the mobile communication system according to the second embodiment comprises a base station including the communication control station 10 and a radio base station 50, and the mobile station 30. The communication control station 10 and the radio base station are connected by the uplink and downlink inter-station transmission paths 40. The radio base station 50 includes the line receiver 21, the reference timing detection unit 22, the radio unit 53 and the line driver 24. In FIG. 10, the radio unit 53 includes the transmission packet generating unit 231, the downlink transmission timing signal generating unit 232, the modulation unit 233, the RF unit 234, the antenna 235, the demodulation unit 236, the uplink transmission timing signal generating unit 237, the reception data buffer unit 238 and an uplink transmission path delay adjusting unit 531.

As shown in FIGS. 9 and 10, in the mobile communication system according to the second embodiment, the radio unit 53 has a different structure from that of the radio unit of the mobile communication system according to the above first embodiment. To be specific, the radio unit 53 of the second embodiment is different from the radio unit 23 of the above first embodiment in that the radio unit 53 includes the uplink transmission path delay adjusting unit 531. Hereinafter, the mobile communication system according to the second embodiment will be described with a focus on the newly-included component element, and component elements denoted by the same reference numerals as those used in the first embodiment will not be further described below.

In the present embodiment, the downlink transmission data generating unit 111 of the communication control unit 10 generates, immediately after receiving an ACK/NACK signal, a payload of a response packet corresponding to the signal, and transmits the payload. For this reason, if neither a timing of outputting an ACK/NACK packet from the reception processing unit 113 of the communication control unit 10 nor a timing of transmitting a response packet from the radio base station 50 is adjusted, the turnaround time changes depending on the length of the inter-station transmission path 40. In the present embodiment, the uplink transmission path delay adjusting unit 531 is provided in the radio unit 53, and an output timing of data retained in a reception data buffer is adjusted, such that the turnaround time is always to be a predetermined turnaround time regardless of the length of the inter-station transmission path 40.

To be specific, based on the input time of the reference timing signal S1, the uplink transmission path delay adjusting unit 531 determines a head point of the TDMA frame of the radio link, taking into account a predetermined transmission process delay TXd. Then, the uplink transmission path delay adjusting unit 531 outputs a readout permission signal RE to the uplink transmission timing signal generating unit 237 with a timing that is adjusted such that the head point of the TDMA frame on the output side of the reception data buffer unit 238 is delayed, in relation to the head point of the TDMA frame of the radio link, by a delay time value predetermined according to the transmission delay of the inter-station transmission path 40. After the readout permission signal RE is inputted, the uplink transmission timing signal generating unit 237 supplies a readout clock READCLK to the reception data buffer unit 238.

Note that, the delay time value is calculated in the communication control station 10 with a precision of a base clock that is the fastest operation clock of the radio base station 50 by adding, to a difference between a predetermined maximum transmission path delay time τ0, which is allocated to the system, and an actual uplink transmission path delay time τdu, which has been previously measured and a difference between the predetermined maximum transmission path delay time τ0 and an actual downlink transmission path delay time τdd, which has been previously measured (i.e., 2 τ0−τdd−τdu), a processing delay value in the RF unit 234 and a processing delay value in the demodulation unit 236, respectively. The uplink transmission path delay adjusting unit 531 adjusts the head point of the TDMA frame by a clock unit of the base clock SCLK.

Figure 11A:
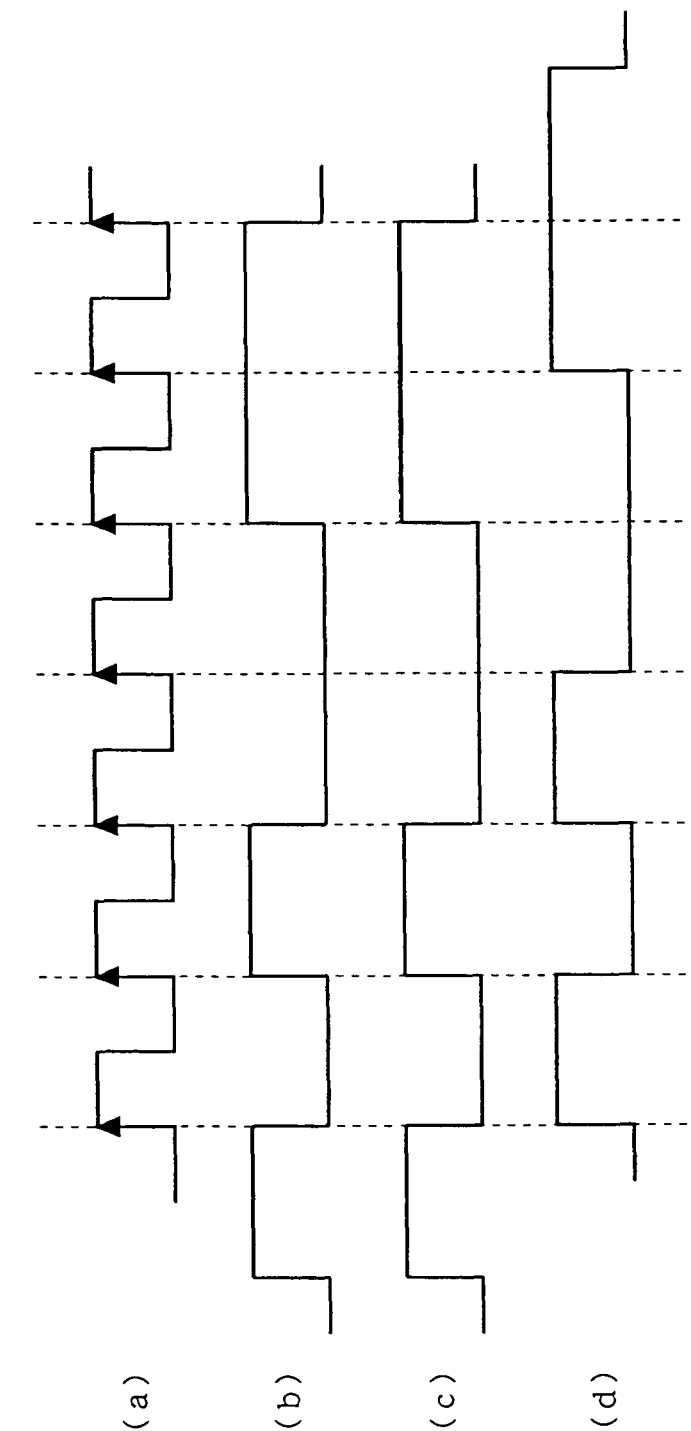
FIG. 11A illustrates a phase relation between a read clock DCLK and uplink transmission data.
Figure 11B:
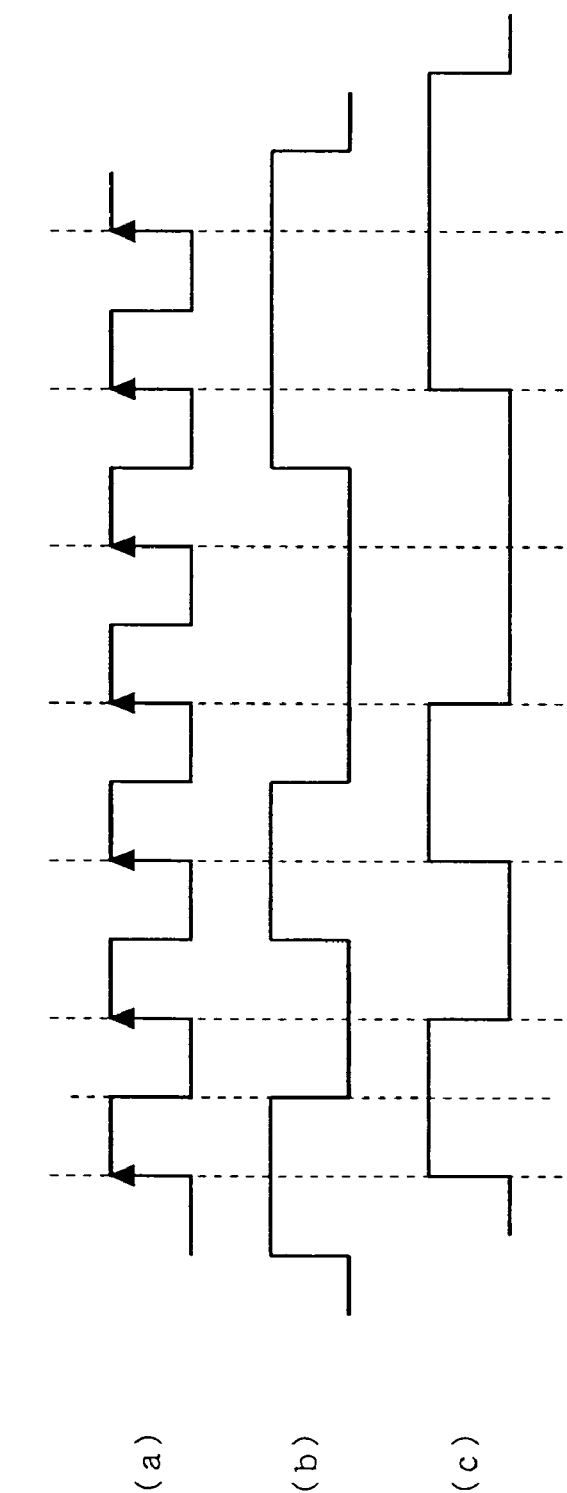
FIG. 11B illustrates a phase relation between the read clock DCLK and the uplink transmission data.

The uplink transmission path delay adjusting unit 531 also adjusts a phase between a read clock DCLK3 and uplink transmission data in the communication control station 10. For example, in the case where a phase relation between the read clock DCLK3 and the uplink transmission data is as shown in (a) and (b) of FIG. 11A, it is unknown whether the UW detection unit 115 takes in the uplink transmission data with a timing shown in (c) or (d) of FIG. 11A. This prevents a stable data intake. However, in the uplink transmission path delay adjusting unit 531 of the present invention, delay adjustment is performed by the clock unit of the base clock SCLK of the radio base station 50 to have an appropriate phase relation between a rising edge of the read clock DCLK in the communication control station 10 and a point of variation of the uplink transmission data that is inputted into the line driver 24. Since the frequency of the base clock SCLK of the radio base station 50 is synchronized with the frequency of the base clock SCLK of the communication control station 10, a phase relation shown in FIG. 11B is maintained between the read clock DCLK of the communication control station 10 and the uplink transmission data. As a result, a latch circuit for reading the uplink transmission data is no longer necessary in the communication control station 10.

As described above, by the mobile communication system and the inter-station transmission method according to the second embodiment of the present invention, the output timing of the uplink transmission data transmitted from the radio base station 50 to the communication control station 10 is adjusted. This makes it possible to comply with the turnaround time of the mobile communication system regardless of the length of the inter-station transmission path 40. Further, since the necessity of latch processing in the communication control station 10 is eliminated, the processing delay Tb in the communication control station 10 is reduced by an elimination of latch processing delay. Therefore, a time that can be allocated for the transmission path delay of the inter-station transmission path 40 is extended by the elimination of latch processing delay.

Third Embodiment

Figure 12:
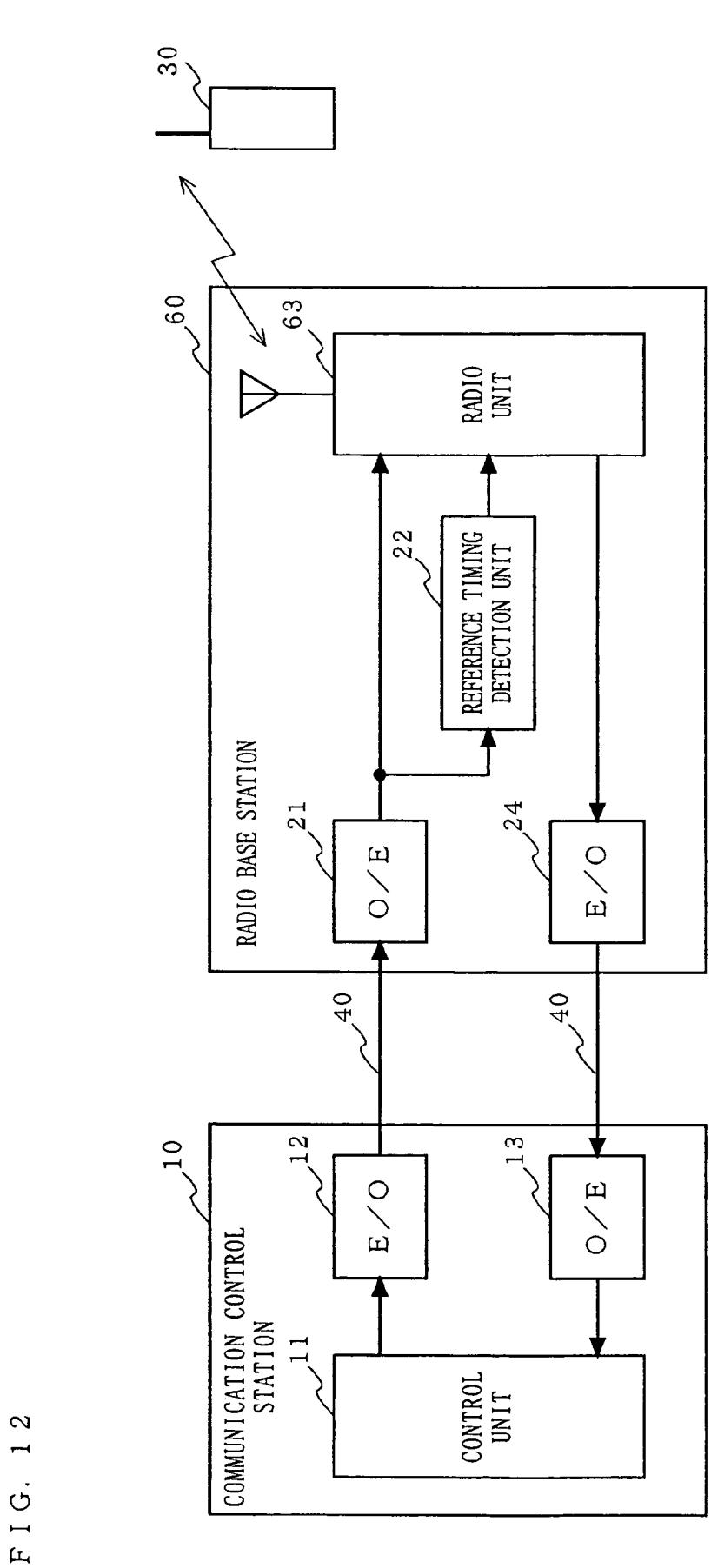
FIG. 12 shows a structure of a mobile communication system according to the third embodiment of the present invention.
Figure 13:
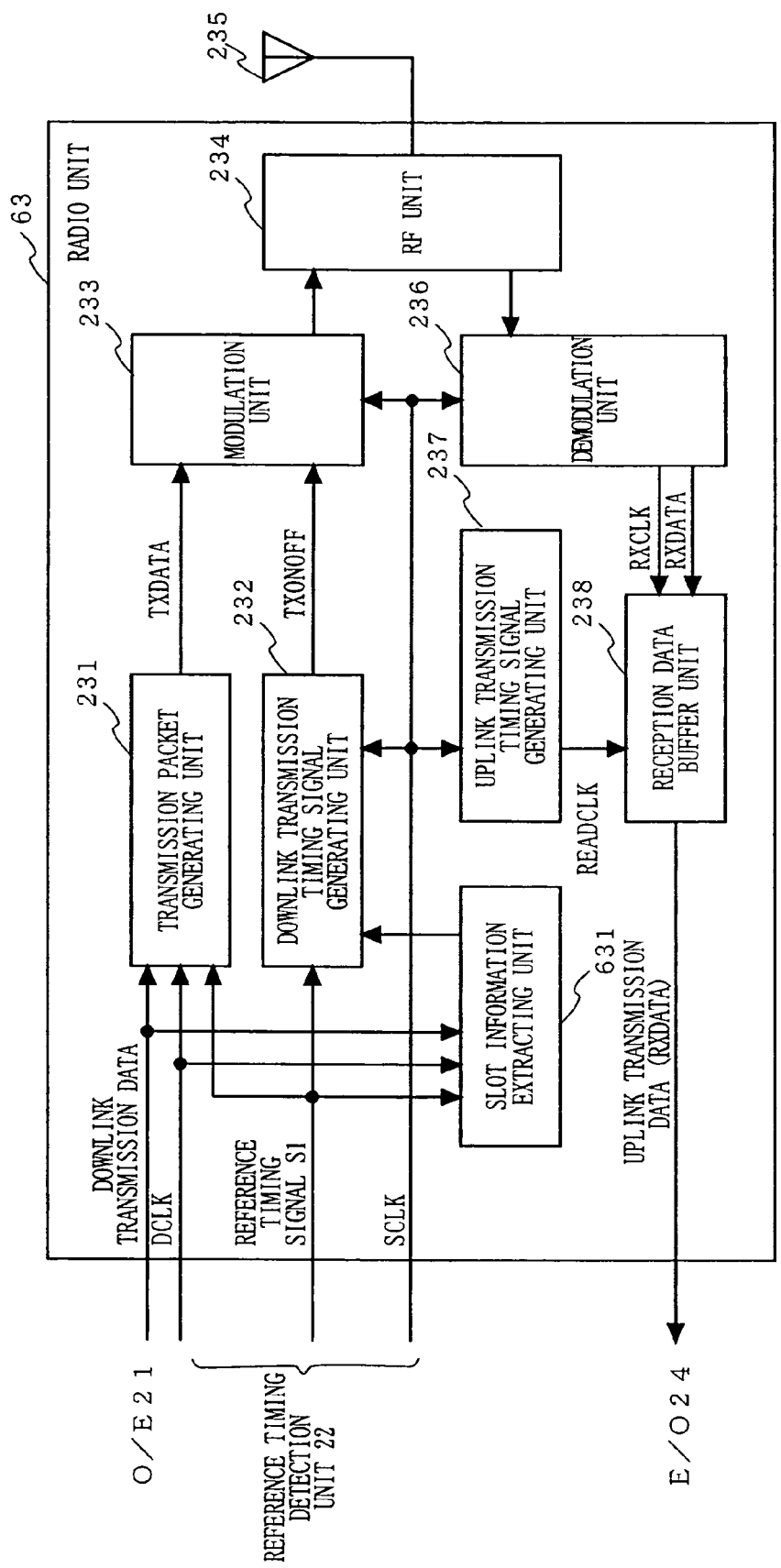
FIG. 13 shows a detailed exemplary structure of a radio unit 63.

FIG. 12 shows a structure of a mobile communication system according to a third embodiment of the present invention. FIG. 13 shows a detailed structure of a radio unit 63. In FIG. 12, the mobile communication system according to the third embodiment comprises a base station including the communication control station 10 and a radio base station 60, and the mobile station 30. The communication control station 10 and the radio base station are connected by the uplink and downlink inter-station transmission paths 40. The radio base station 60 includes the line receiver 21, the reference timing detection unit 22, the radio unit 63 and the line driver 24. In FIG. 13, the radio unit 63 includes the transmission packet generating unit 231, the downlink transmission timing signal generating unit 232, a slot information extracting unit 631, a modulation unit 233, the RF unit 234, the antenna 235, the demodulation unit 236, the uplink transmission timing signal generating unit 237 and the reception data buffer unit 238.

As shown in FIGS. 12 and 13, in the mobile communication system according to the third embodiment, the radio unit 63 has a different structure from that of the radio unit of the mobile communication system according to the first embodiment. To be specific, the radio unit 63 according to the third embodiment is different from the radio unit 23 according to the above first embodiment in that the radio unit 63 includes the slot information extracting unit 631. Hereinafter, the mobile communication system according to the third embodiment will be described with a focus on the newly-included component element, and component elements denoted by the same reference numerals as those used in the previous embodiments will not be further described below.

In the present embodiment, the downlink transmission data generating unit 111 of the communication control unit 10 generates, immediately after receiving an ACK/NACK signal, a payload of a response packet corresponding to the signal, and transmits the payload with an identification code added thereto for identifying the response packet. For this reason, if neither the timing of outputting an ACK/NACK packet from the reception processing unit 113 of the communication control unit 10 nor the timing of transmitting the response packet from the radio base station 60 is adjusted, the turnaround time changes depending on the length of the inter-station transmission path 40. In the present embodiment, the slot information extracting unit 631 is provided in the radio unit 63, and a transmission timing of a particular packet (response packet) is adjusted, such that the turnaround time is always to be a predetermined turnaround time regardless of the length of the inter-station transmission path 40.

To be specific, the slot information extracting unit 631 converts downlink transmission data, which has been converted into CMI code, into NRZ code by using the base clock SCLK and the BSU transmission clock DCLK, and, based on the input time of the reference timing signal S1, extracts the FCMC payload existing in a predetermined position by using, as a reference point, the insertion point of the reference timing detection code within the TDMA frame. Then, the slot information extracting unit 631 outputs, to the downlink transmission timing signal generating unit 232, slot information indicating a time slot structure of the TDMA frame contained in the FCMC payload. Based on the slot information, the downlink transmission timing signal generating unit 232 delays, in relation to a response packet which is transmitted in a particular slot within the TDMA frame (ACKC transmitted in the MDS slot), an output of a transmission timing signal TXONOFF by a delay time adjustment value predetermined according to the transmission path delay of the inter-station transmission path 40. The transmission packet generating unit 231 detects the identification code for identifying the response packet to extract a payload of the response packet, and performs the same processing as that of the above first embodiment to generate a response packet, and then retains the response packet. Then, the transmission packet generating unit 231 outputs the response packet as the transmission data TXDATA to the modulation unit 233 with a timing which is delayed by a delay time adjustment value predetermined according to the transmission path delay of the inter-station transmission path 40, the timing corresponding to the output of the TXONOFF.

As described above, by the mobile communication system and the inter-station transmission method according to the third embodiment of the present invention, the output timing of the downlink transmission data transmitted from the communication control unit 10 to the radio base station 60 is adjusted. This makes it possible to comply with the turn-around time of the mobile communication system regardless of the length of the inter-station transmission paths 40.

The adjustment of the output timing of the downlink transmission data described in the third embodiment can of course be performed in combination with the adjustment of the output timing of the uplink transmission data described in the above second embodiment. In the second and third embodiments, structures are described in which the delay adjustment of the inter-station transmission path 40 is performed in the radio base station 50 or 60. However, a structure for performing the delay adjustment of the inter-station transmission path 40 may also be provided in the communication control station 10, and the delay adjustment may be performed in both the radio base station 50 (or 60) and the communication control station 10.

Fourth Embodiment

Figure 23:
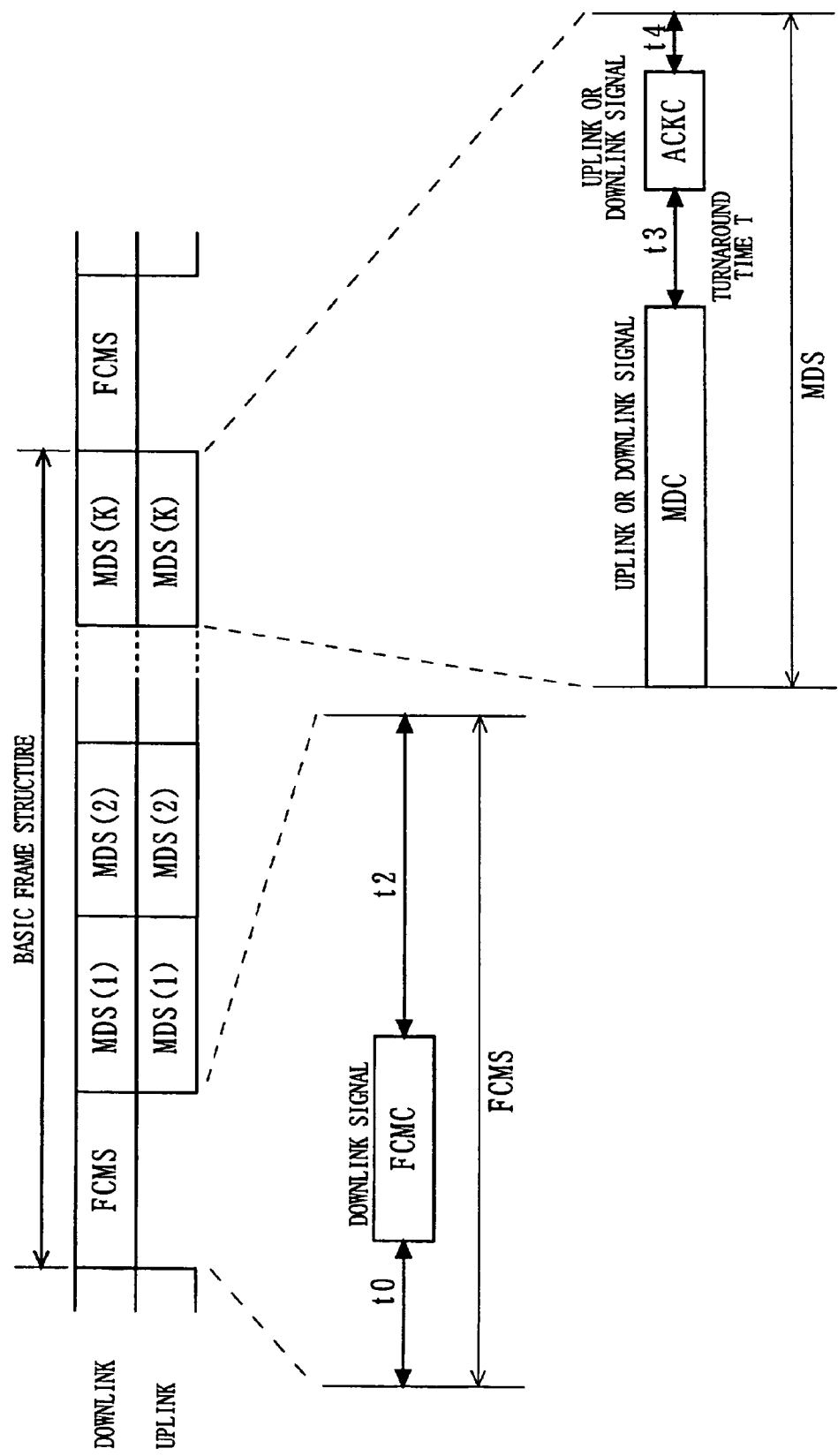
FIG. 23 shows an exemplary structure of a TDMA frame of ARIB STD-T75.
Figure 24:
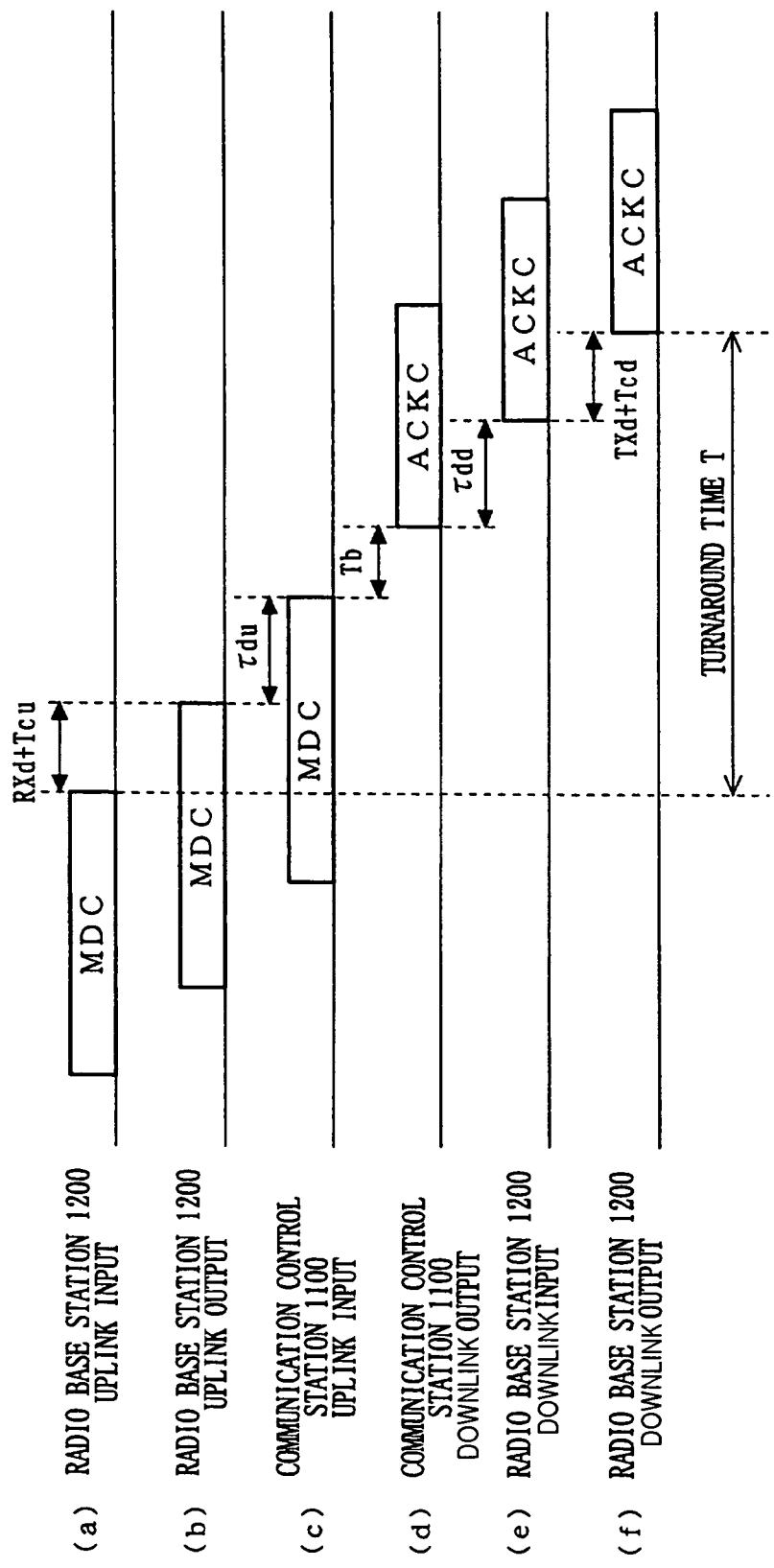
FIG. 24 illustrates a turnaround time required for the conventional mobile communication system shown in FIG. 20.

As shown in FIG. 23, in a TDMA frame transmission format of the DSRC system, there always exists, within the TDMA frame, one control slot (FCMS) with which the mobile station 30 does not perform transmission, the control slot being allocated to a downlink. In the mobile communication system of the present invention, the TDMA frame transmission format of the DSRC system used for the radio link is also used for the inter-station transmission path 40, and transmission is performed, using the same transmission format as that used in a radio domain. Therefore, there exists a FCMS on the inter-station transmission path 40 too. In the fourth embodiment, since reception data from the mobile station 30 does not exist in the FCMS, the FCMS is used for collecting, in the communication control station 10, monitoring data about the radio base station 70.

Figure 14:
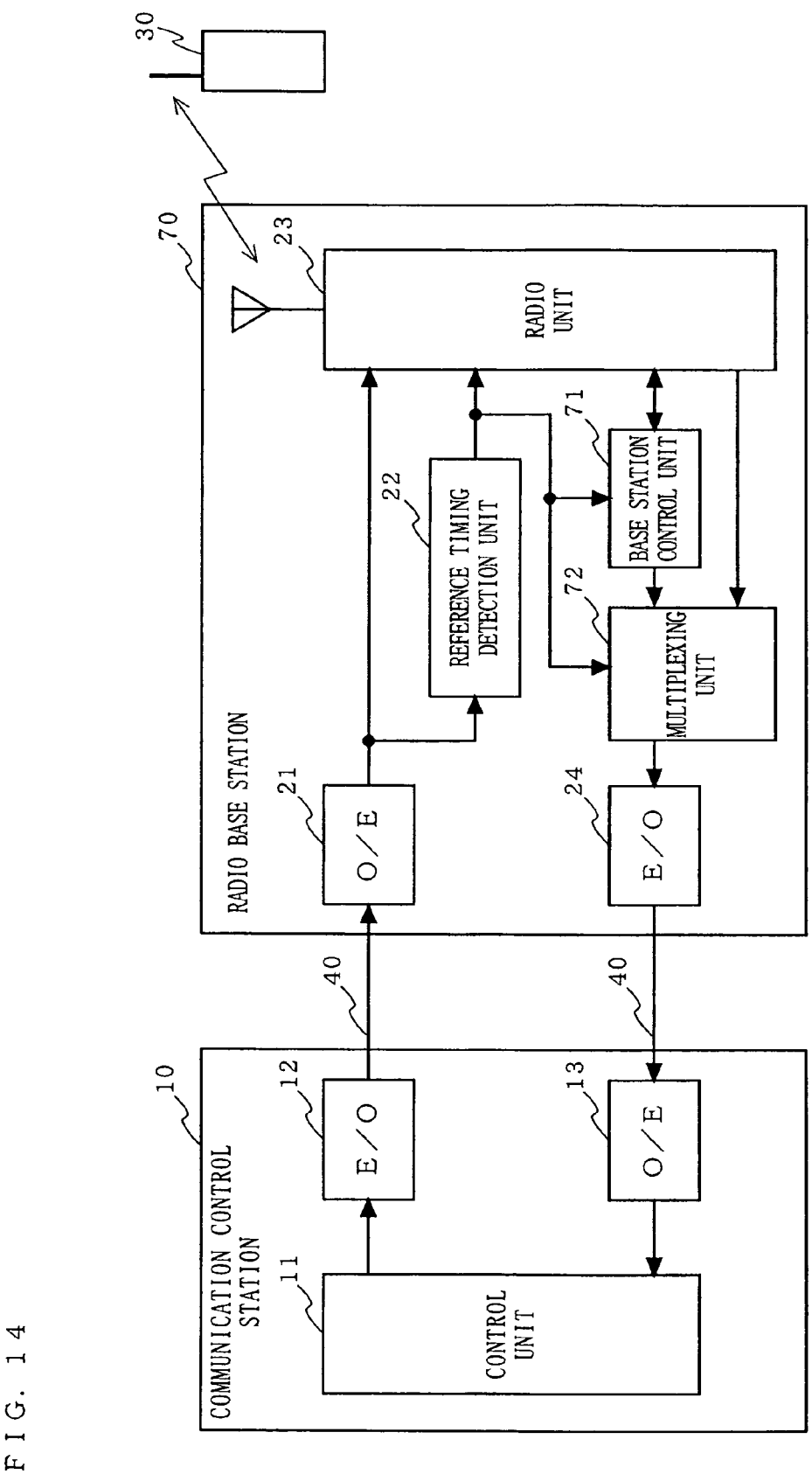
FIG. 14 shows a structure of a mobile communication system according to the fourth embodiment of the present invention.

FIG. 14 shows a structure of a mobile communication system according to a fourth embodiment of the present invention. In FIG. 14, the mobile communication system according to the fourth embodiment comprises a base station including the communication control station 10 and a radio base station 70, and the mobile station 30. The communication control station 10 and the radio base station 70 are connected by the uplink and the downlink inter-station transmission paths 40. The radio base station 70 includes the line receiver 21, the reference timing detection unit 22, the radio unit 23, a base station control unit 71, a multiplexing unit 72 and the line driver 24.

As shown in FIG. 14, the mobile communication system according to the fourth embodiment is different from the mobile communication system according to the above first embodiment in that the mobile communication system according to the fourth embodiment has the base station control unit 71 and the multiplexing unit 72. Hereinafter, the mobile communication system according to the fourth embodiment will be described with a focus on the newly-included component elements, and component elements denoted by the same reference numerals as those used in the previous embodiments will not be further described below.

The base station control unit 71 uses, as a reference point, the input time of the reference timing signal S1, and extracts, from downlink transmission data, control information for setting transmission and reception frequencies of the RF unit 234, and controls, for example, a frequency and transmission power setting of the radio unit 23. The base station control unit 71 receives from the radio unit 23 a state monitoring signal SDATA indicating whether the radio unit 23 is in a normal state (i.e., whether or not the transmission/reception frequencies of the RF unit 234 and a transmission power value of the RF unit 234 are normal), and outputs the state monitoring signal SDATA to the multiplexing unit 72. The multiplexing unit 72 multiplexes the state monitoring signal SDATA inputted from the base station control unit 71 and the RXDATA inputted from the radio unit 23, and outputs a resultant signal to the line driver 24.

UW detection unit 115 extracts the state monitoring signal SDATA by detecting a unique word from uplink transmission data transmitted from the radio base station 70, and then outputs the state monitoring signal SDATA to the information retaining unit 110 as base station monitoring data.

As described above, in the mobile communication system and the inter-station transmission method according to the fourth embodiment of the present invention, the TDMA frame transmission format of the DSRC system used for the radio link is also used for the inter-station transmission path. This makes it possible to regularly transmit the monitoring data from the radio base station to the communication control station in a TDMA frame period by using a timing of the control slot, in which there is no reception signal from the mobile station.

The above-described radio base station monitoring method is applicable to a communication system using the TDMA system, which has, within a TDMA frame, a time slot allocated only to the downlink.

Fifth Embodiment

Figure 15:
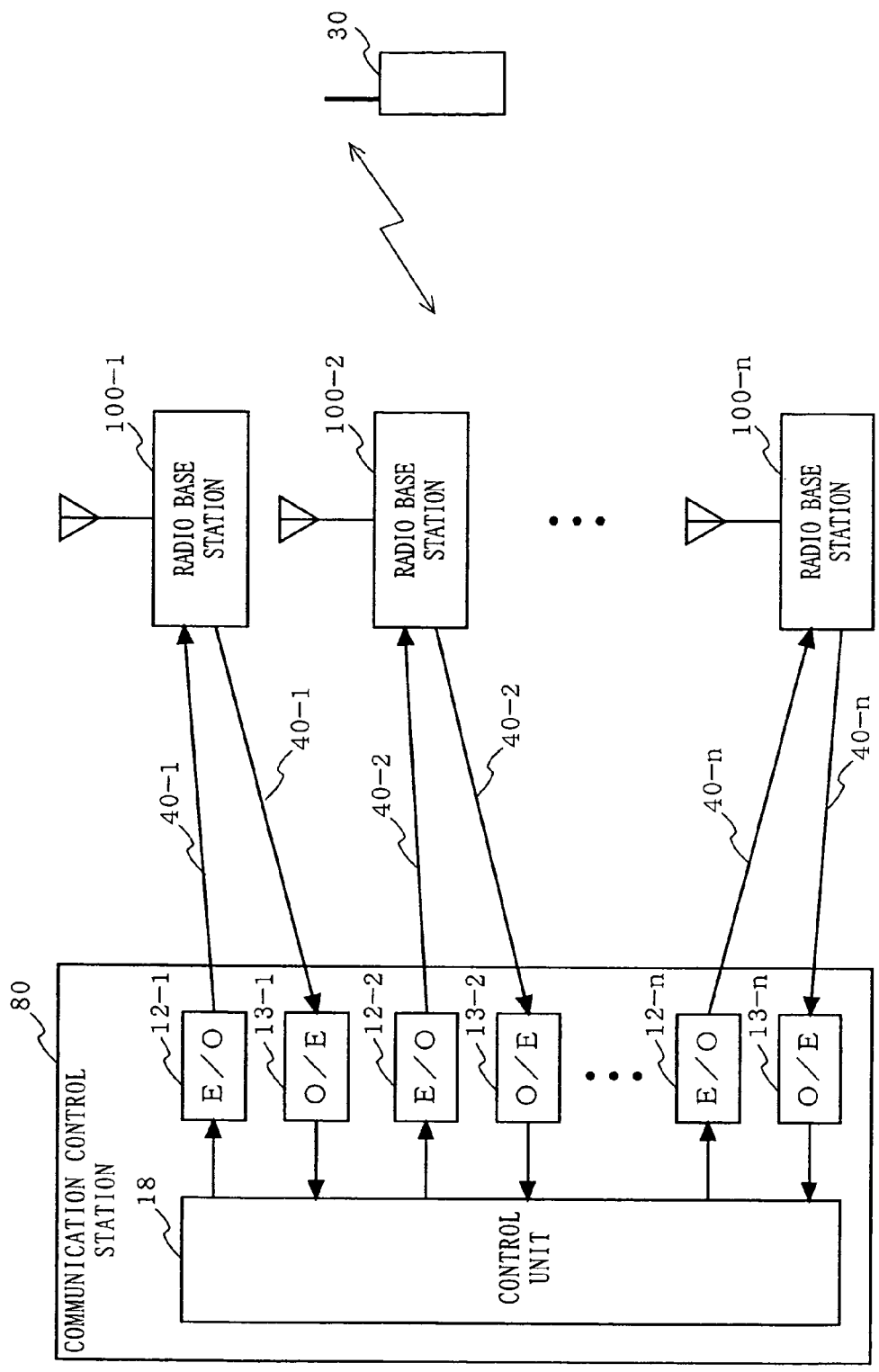
FIG. 15 shows a structure of a mobile communication system according to the fifth embodiment of the present invention.
Figure 16:
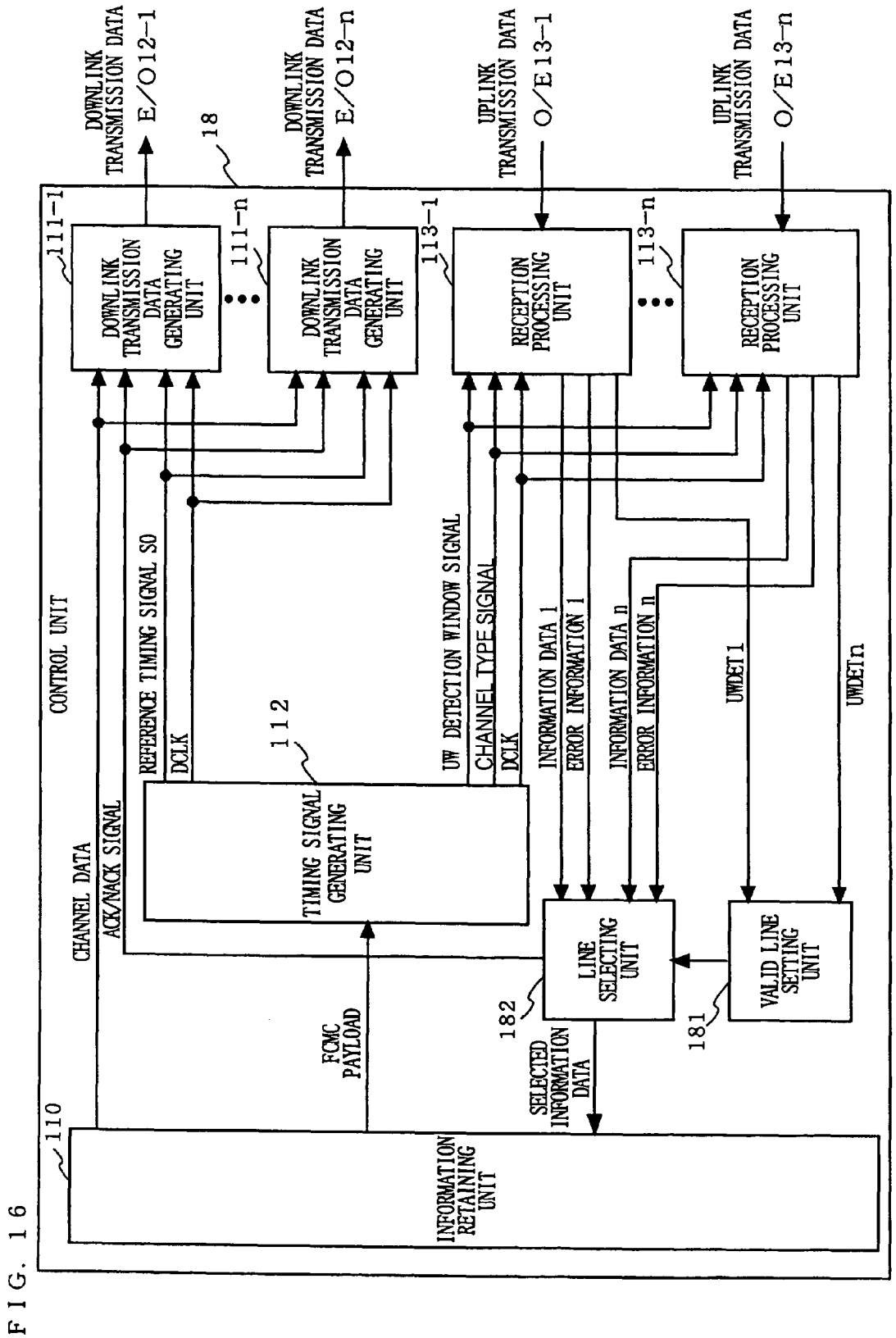
FIG. 16 shows a detailed exemplary structure of a control unit 18.

FIG. 15 shows a structure of a mobile communication system according to a fifth embodiment of the present invention. FIG. 16 shows a detailed structure of a control unit 18. In FIG. 15, the mobile communication system according to the fifth embodiment comprises a base station including a communication control station 80 and a plurality of radio base stations 100-1 to 100-n, and the mobile station 30. The communication control station 80 is connected to each of the radio base stations 100-1 to 100-n by uplink and downlink inter-station transmission paths 40-1 to 40-n, respectively. Each of the plurality of radio base stations 100-1 to 100-n has the same structure as that of any of the radio base stations 20, 50, 60 and 70 described in the above first to fourth embodiments. The communication control station 80 includes the control unit 18, and a plurality of line drivers 12-1 to 12-n and a plurality of line receivers 13-1 to 13-n corresponding to the radio base stations 100-1 to 100-n, respectively.

In FIG. 16, the control unit 18 includes the information retaining unit 110, a plurality of downlink transmission data generating units 111-1 to 111-n respectively corresponding to the plurality of radio base stations 100-1 to 100-n, the timing signal generating unit 112, a plurality of reception processing units 113-1 to 113-n respectively corresponding to the plurality of radio base stations 100-1 to 100-n, a valid line setting unit 181 and a line selecting unit 182.

As shown in FIGS. 15 and 16, the mobile communication system according to the fifth embodiment has a structure in which the communication control station 80 corresponds to n radio base stations 100-1 to 100-n. The control unit 18 is different from the control unit 11 of the mobile communication system according to the above first embodiment in that the control unit 18 has the valid line setting unit 181 and the line selecting unit 182. Hereinafter, the mobile communication system according to the fifth embodiment will be described with a focus on the newly-included component elements, and component elements denoted by the same reference numerals as those used in the previous embodiments will not be further described below. Since all the radio base stations 100-1 to 100-n perform the same processes, the radio base stations 100-1 to 100-n are denoted as a radio base station 100 when common matters for these are described. The same applies to the downlink transmission data generating units 111-1 to 111-n, the reception processing units 113-1 to 113-n and the inter-station transmission paths 40-1 to 40-n.

The timing signal generating unit 112 analyses FCMC payload data to recognize a slot structure and a frame period of a TDMA frame, and outputs, to the reception processing unit 113, a channel type signal indicating channel information that is contained in uplink transmission data to be inputted at this point. According to the recognized frame period and slot structure, the timing signal generating unit 112 determines, based on the reference timing signal S0, a timing at which a unique word such as a MDC or an ACKC contained in the uplink transmission data is possibly inputted (UW detection valid period), and outputs, to the reception processing unit 113, a UW detection window signal indicating the timing.

Based on the UW detection window signal, which indicates the UW detection valid period, and the channel type signal, which are supplied from the timing signal generating unit 112, the reception processing unit 113 detects a unique word such as a FCMC or a MDC of the uplink transmission data transmitted from the radio base station 100, and extracts a payload of the uplink transmission data. Then the reception processing unit 113 outputs a unique word detection signal UWDET to the valid line setting unit 181, and also outputs information data and error information to the line selecting unit 182. Next, the reception processing unit 113 performs predetermined processing on the extracted payload such as descrambling, error detection and error correction, and generates information data by removing redundant components such as an error correction code and an error detection code from the payload, and also generates error information which is obtained from the error detection and error correction and which indicates whether or not there is an error and the estimated number of error bits. Then, the reception processing unit 113 outputs the information data and the error information to the line selecting unit 182.

The valid line setting unit 181 uses, as a reference, a unique word detection signal UWDET to have been first inputted from one of the plurality of reception processing units 113-1 to 113-n, and sets, as a valid period, a predetermined period of time after the input time of the UWDET. The valid line setting unit 181 sets, as a valid option, the reception processing unit 113 that has inputted the UWDET within the valid period. Then, the valid line setting unit 181 inputs, to the line selecting unit 182, a valid line signal indicating the number of the valid options among the reception processing units 113-1 to 113-n. Based on the valid line signal inputted from the valid line setting unit 181, the line selecting unit 182 compares a plurality of error information inputted from the valid options among the reception processing units 113-1 to 113-n, and selects a reception processing unit 113-i ("i" represents any from 1 to n) whose error information indicates no error or the smallest estimated number of error bits. Then, the line selecting unit 182 outputs, to the information retaining unit 110, information data received from the selected reception processing unit 113-i as selected information data. The line selecting unit 182 checks a CRC code added to the selected information data, and determines whether a MDC has been received properly. The line selecting unit 182 supplies, to each of the downlink transmission data generating units 111-1 to 111-n, an ACK signal when the MDC has been received properly, and supplies an NACK signal when the MDC has not been received properly. In the QPSK system complying with ARIB STD-T75, a MDC payload is composed of a plurality of error correction blocks. Accordingly, the line selecting unit 182 performs the above described selection procedure on each error correction block.

Figure 17:
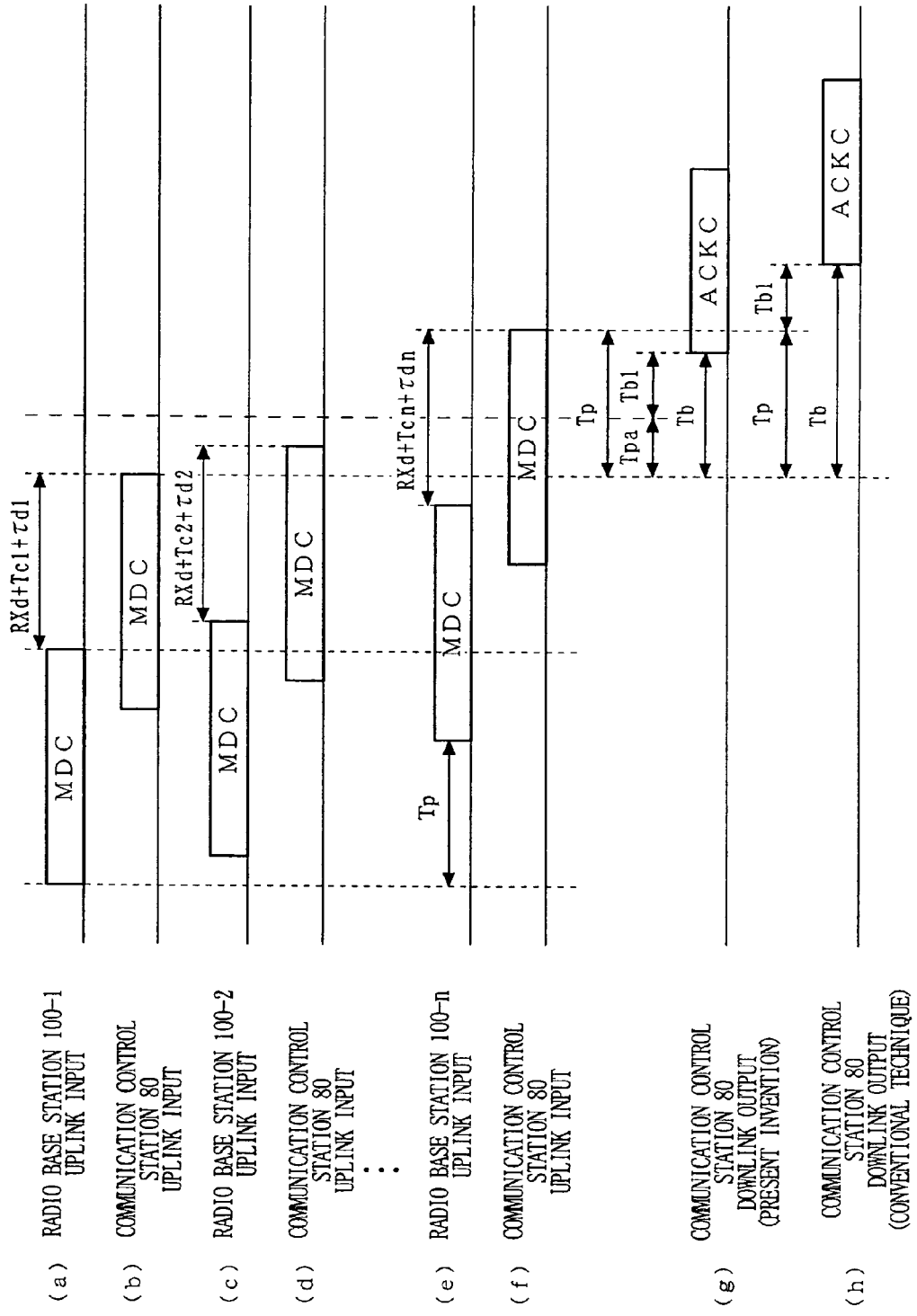
FIG. 17 shows a difference, between the present invention and a conventional art, of a time from a reception of a MDC packet until a transmission of an ACKC packet in a radio base station 100.

In the fifth embodiment, since the predetermined valid period is provided, the selection procedure in the line selecting unit 182 is not necessarily performed on all the reception processing units 113. Therefore, even if the length of a service area is increased, a processing delay at the line selecting unit 182 can be constantly suppressed. This will be described hereinafter with reference to FIG. 17. FIG. 17 shows, between the present invention and the conventional art, a difference in a time from the reception of the MDC packet until the transmission of the ACKC packet in the radio base station 100.

Figure 19:
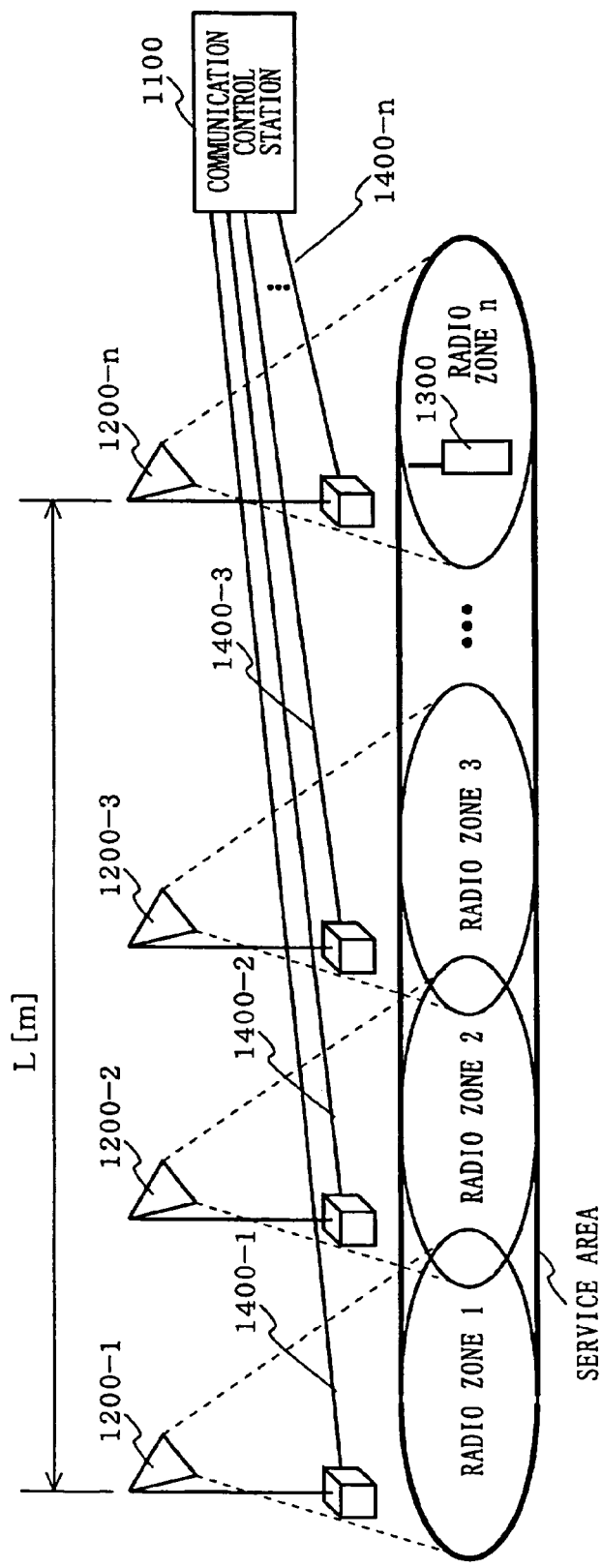
FIG. 19 shows a structure of a conventional mobile communication system to which a multi-station system is applied.
Figure 20:
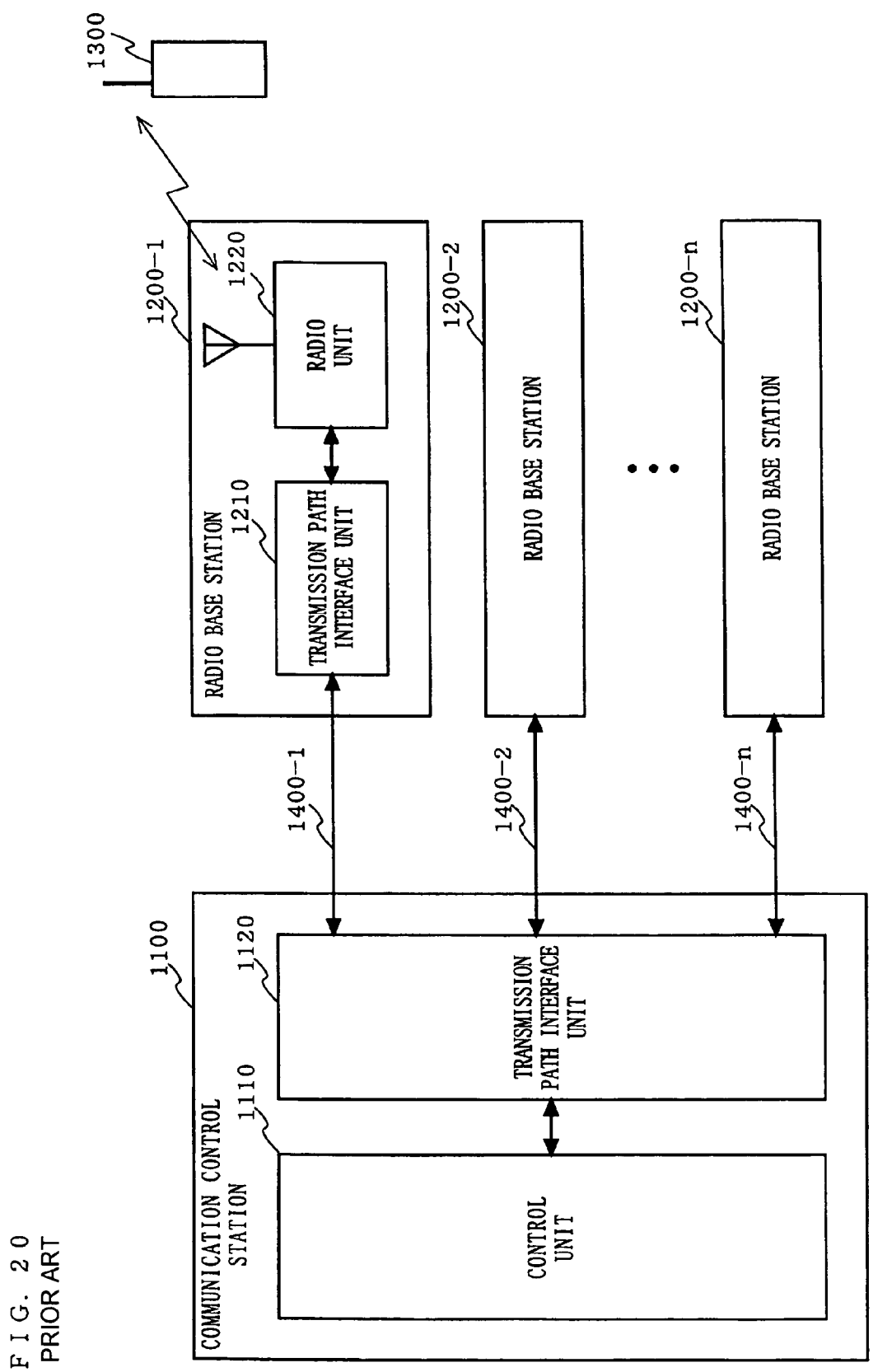
FIG. 20 shows an exemplary structure of a base station of the conventional mobile communication system to which the multi-station system is applied.
Figure 21:
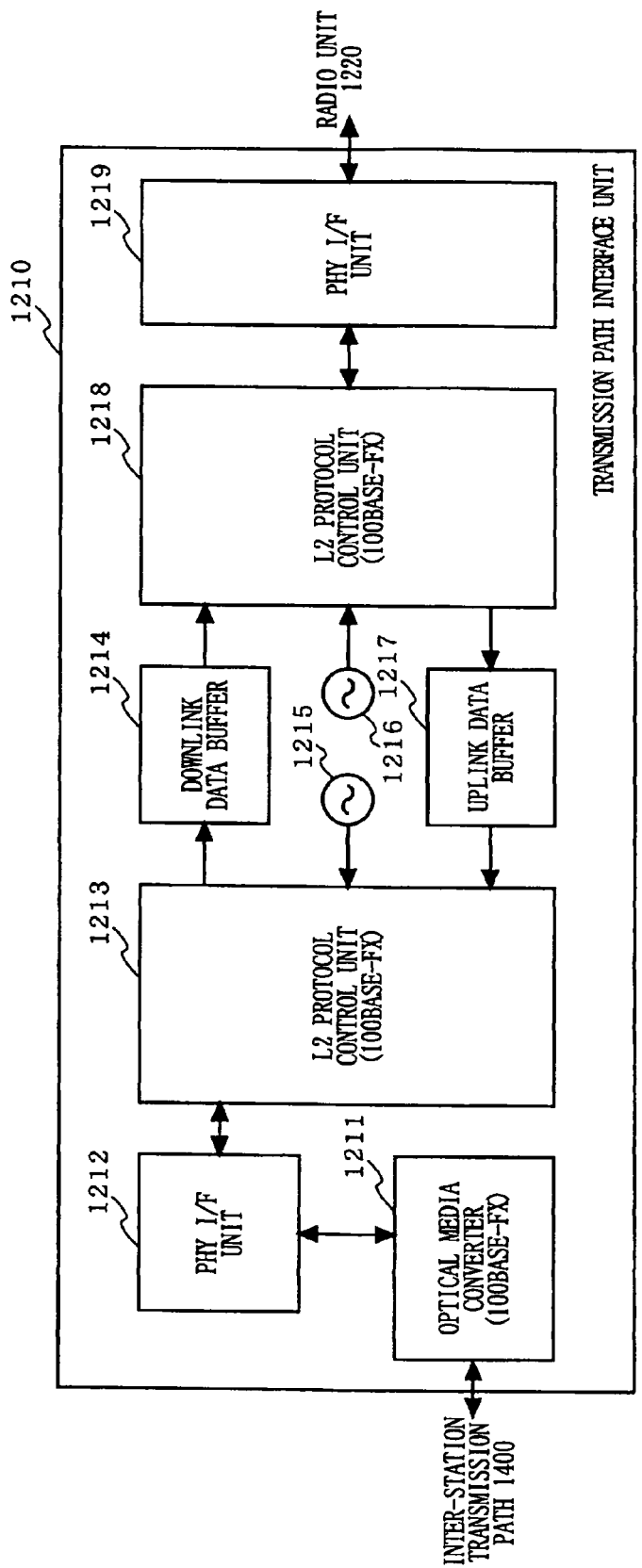
FIG. 21 shows a detailed exemplary structure of a transmission path interface unit 1210 of FIG. 20
Figure 22:
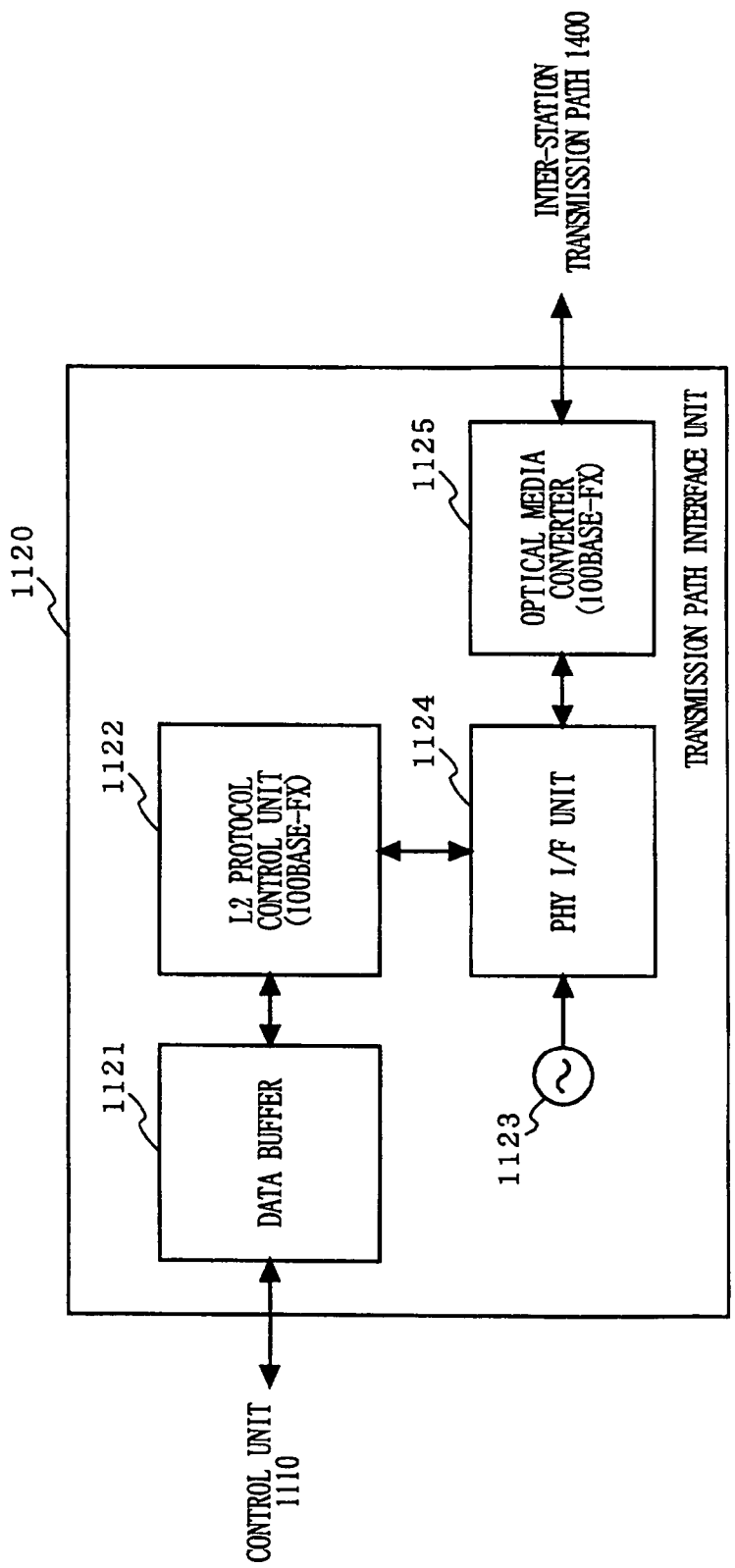
FIG. 22 shows a detailed exemplary structure of a transmission path interface unit 1120 of FIG. 20.

Assuming as shown in FIG. 19 that the service area is long from side to side and a distance between an antenna of the radio base station 100-1 and an antenna of the radio base station 100-n is "L" meters, a time difference approximately L/C seconds (C represents the velocity of light) occurs, between the radio base station 100-1 and the radio base station 100-n, in an arrival time of a MDC packet which is transmitted, from the mobile station 30 in a radio zone "n". Hereinafter, this arrival time difference will be referred to as an arrival time difference Tp. Since all the radio base stations 100 perform the same procedure, reception processing delays for all the radio base stations are virtually the same, which is "Rxd". Even in the case where the length of the inter-station transmission path 40 is different for each of the radio base stations 100, due to the adjustment performed by the uplink transmission path delay adjusting unit 531 of the radio base station 100, uplink transmission data is received by each of the reception processing units 113 while the arrival time difference Tp of the radio base station 100 is maintained. If pieces of uplink transmission data of all the radio base stations 100 are used as pieces of valid data, the line selecting unit 182 does not stop operating until processing of the latest inputted piece of data is completed at the reception processing unit 113-1. Consequently, as shown in (h) of FIG. 17, a BSU processing delay is prolonged by the arrival time difference Tp, as compared with a processing delay Tb1 which occurs when there is only one radio base station 100. The longer the length L of the service area becomes, the more the processing delay of the BSU increases. As a result, a time that can be allocated for a transmission path delay of the inter-station transmission paths is reduced, and inter-station transmission distance cannot be extended.

In the fifth embodiment, since the valid period is provided for the selection procedure in the line selecting unit 182, even if the length of the service area is increased, the processing delay at the line selecting unit 182 is constantly suppressed, and the above-described problem is prevented. The predetermined time set by the valid line setting unit 181 as the valid period may be set, for example, according to a zone length covered by only one radio base station 100. For instance, in the case as shown in FIG. 19 where each of the radio base stations 100 has a small radio zone within which each of the radio base stations 100 performs reception properly, and the small radio zones are combined to form a large radio zone, the probability of receiving a packet properly from a mobile station located in the next small radio zone is considered to be relatively high. However, the probability of receiving a packet properly from a mobile station located in a small radio zone which is further than the next small radio zone is considered to be significantly lower than the probability of not receiving the packet properly. In such a case, the valid period may be set allowing for the arrival time difference Tp for a transmission distance which is twice or three times as long as the zone length covered by only one radio base station 100.

In the case where the actual length of an inter-station transmission path is shorter than a length for the predetermined maximum transmission path delay time τ0 that is allocated to the system, the predetermined time set by the valid line setting unit 181 as the valid period may be extended by a difference between the longest transmission path delay time among the plurality of inter-station transmission paths and τ0. This makes it possible to use, for diversity reception, the maximum number of radio base stations corresponding to the actual transmission path delay.

As described above, the mobile communication system and the inter-station transmission method according to the fifth embodiment of the present invention reduce the processing delay time by providing the valid period, thereby producing the above-described effects also in a mobile communication system involving a plurality of radio base stations.

In the above embodiments, the methods for transmitting the FCMC, MDC and ACKC have been described. Other channels specified according to ARIB STD-T75 (ACTC and WCNC) may also be transmitted in the same manner as that of the transmission of the MDC packet.

Figure 18:
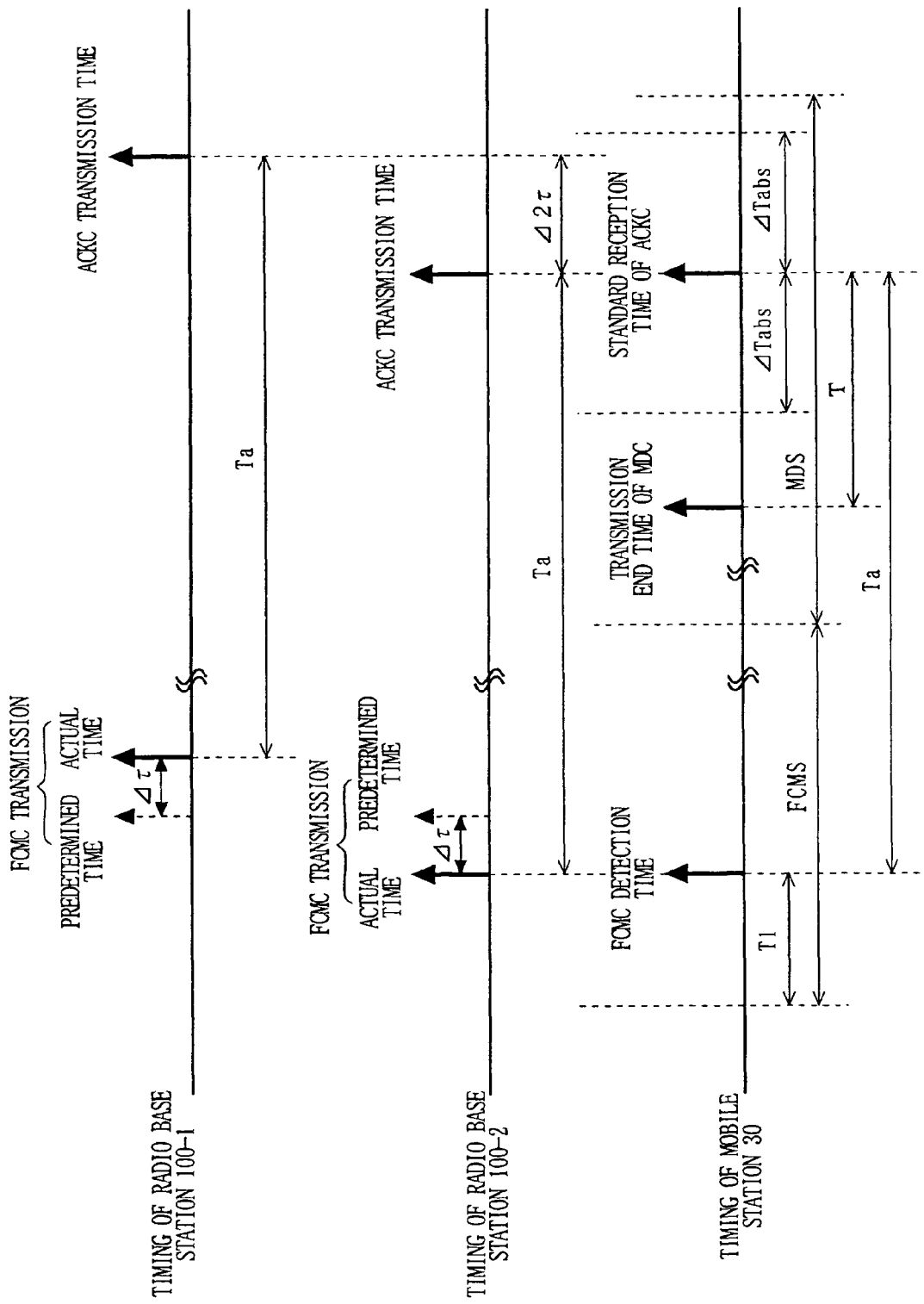
FIG. 18 illustrates a delay adjustment error that occurs in the case where a plurality of radio base stations 100 are present.

The method described in the above third embodiment for adjusting the timing of transmitting the downlink data produces a great effect in the case where there are the plurality of radio base stations 100 as described in the fifth embodiment. If a delay adjustment error does not occur among the plurality of radio base stations 100, a part of a prescribed permissible error ΔTabs in addition to a standard turnaround time T can be allocated for a transmission path delay. However, in practice, a delay adjustment error Ai occurs as shown in FIG. 18, and the permissible error that can be allocated for the transmission path delay is reduced by a maximum error 2Δτ. For this reason, adjusting the output timing of downlink transmission data at each of the radio base stations 100 allows the error to be suppressed effectively.

The inter-station transmission method of the present invention is applicable to, for example, a mobile communication system that employs the TDMA system, in which a response signal is required to be returned from a base station to a mobile station within a predetermined period of time. For instance, the inter-station transmission method of the present invention is applicable to a DSRC system complying with ARIB STD-T75.

The invention claimed is:

1. An inter-station transmission method used in a mobile communication system comprising a mobile station and a base station operable to return, to the mobile station by means of a TDMA system, a response packet, the response packet being returned by the base station in response to a packet received from the mobile station, and the response packet being returned within a same time slot used for receiving the response packet, wherein the base station includes:
 a radio base station operable to demodulate an uplink packet signal received from the mobile station and extract uplink transmission data, and operable to modulate downlink transmission data to be transmitted to the mobile station and generate a downlink packet signal;
 a communication control station operable to receive the uplink transmission data from the radio base station, generate downlink transmission data corresponding to the uplink transmission data received from the radio base station and transmit the generated downlink transmission data to the radio base station; and
 an inter-station transmission path that establishes a wired connection between the radio base station and the communication control station, and
wherein the inter-station transmission method includes:
 in the radio base station, transmitting the uplink transmission data from the radio base station to the communication control station, the uplink transmission data being transmitted in a TDMA frame format used for a radio link between the radio base station and the mobile station;
 transmitting the downlink transmission data, in the TDMA frame format, from the communication control station to the radio base station in accordance with a predetermined communication control station transmission clock, wherein the downlink transmission data includes a channel data packet, which is within the TDMA frame, to be transmitted inserted therein, and includes dummy data for reproducing a radio base station reception clock inserted therein in a period in which the channel data packet to be transmitted is not present;
 in the communication control station, processing the uplink transmission data received from the radio base station in the TDMA frame format;
 in the radio base station, reproducing the radio base station reception clock synchronized with the predetermined communication control station transmission clock, the radio base station reception clock being reproduced from the downlink transmission data received from the communication control station; and
 in the radio base station, processing the downlink transmission data using the radio base station reception clock.

2. The inter-station transmission method according to claim 1, wherein the radio base station reception clock is reproduced in the radio base station using PLL control.

3. The inter-station transmission method according to claim 1,
wherein, in the communication control station, a communication control station reception clock, which results from multiplying or dividing the predetermined communication control station transmission clock by n (n is a natural number), is used to receive the uplink transmission data,
wherein, in the radio base station, a radio base station operation clock is generated by multiplying the radio base station reception clock by m (m is an integer greater than 1),
wherein, in the radio base station, the uplink transmission data is transmitted using a radio base station transmission clock that results from multiplying or dividing the radio base station operation clock by k (k is a natural number) and has a frequency synchronized with the communication control station reception clock, and
wherein, a phase difference, which occurs according to a length of the inter-station transmission path, between the radio base station transmission clock and the communication control station reception clock is adjusted by a clock unit of the radio base station operation clock.

4. The inter-station transmission method according to claim 1,
wherein, when a response signal is transmitted from the communication control station, only a payload portion of the response packet is transmitted to the radio base station, and
wherein, in the radio base station, transmission of the response packet begins with a predetermined timing using header information previously retained, without waiting for an arrival of the payload portion from the communication control station.

5. The inter-station transmission method according to claim 1,
wherein a plurality of radio base stations are respectively connected to the communication control station via a plurality of respective inter-station transmission paths, and
wherein each radio base station of the plurality of radio base stations adjusts, using a respective clock unit of a respective radio base station operation clock, a delay time difference, which occurs according to a length of the respective inter-station transmission path, between a downlink transmission path delay and a predetermined transmission path delay.

6. The inter-station transmission method according to claim 1,
wherein a plurality of radio base stations are respectively connected to the communication control station via a plurality of respective inter-station transmission paths,
wherein, in the communication control station, a plurality of pieces of uplink transmission data, which are respectively outputted from each radio base station of the plurality of radio base stations and which correspond to a same packet received from the mobile station, are received in a predetermined slot,
wherein, in the communication control station, a reception timing of uplink transmission data is detected, the uplink transmission data corresponding to a packet having been first received, and
wherein, in the communication control station, a selection process is performed only on uplink transmission data that has been received before a predetermined period of time has passed after the reception timing.

7. The inter-station transmission method according to claim 6, wherein the predetermined period of time is set according to a length of an area covered by the plurality of radio base stations.

8. The inter-station transmission method according to claim 6, wherein the predetermined period of time is set according to a length of a longest inter-station transmission path among the plurality of inter-station transmission paths.

9. A radio base station monitoring method used in a mobile communication system comprising a mobile station and a base station operable to return, to the mobile station by means of a TDMA system, a response packet, the response packet being returned by the base station in response to a packet received from the mobile station, and the response packet being returned within a same time slot used for receiving the response packet,
wherein the base station includes:
a radio base station operable to demodulate an uplink packet signal received from the mobile station and extract uplink transmission data, and operable to modulate downlink transmission data to be transmitted to the mobile station and generate a downlink packet signal;
a communication control station operable to receive the uplink transmission data from the radio base station, generate downlink transmission data corresponding to the uplink transmission data received from the radio base station and transmit the generated downlink transmission data to the radio base station; and
an inter-station transmission path that establishes a wired connection between the radio base station and the communication control station, and
wherein the radio base station monitoring method includes:
in the radio base station, generating monitoring data for notifying a state of the radio base station to the communication control station;
in the radio base station, time division multiplexing the monitoring data into the uplink transmission data with a slot timing that is only allocated to a downlink;
in the radio base station, transmitting the uplink transmission data and the monitoring data to the communication control station, the uplink transmission data and the monitoring data being transmitted in a TDMA frame format used for a radio link between the radio base station and the mobile station;
in the communication control station, transmitting the downlink transmission data, in the TDMA frame format, from the communication control station to the radio base station in accordance with a predetermined communication control station transmission clock, wherein the downlink transmission data includes a channel data packet, which is within the TDMA frame, to be transmitted inserted therein, and includes dummy data for reproducing a radio base station reception clock inserted therein in a period in which the channel data packet to be transmitted is not present;
in the communication control station, processing the uplink transmission data received from the radio base station in the TDMA frame format;
in the communication control station, monitoring the state of the radio base station using the monitoring data;
in the radio base station, reproducing the radio base station reception clock synchronized with the predetermined communication control station transmission clock, the radio base station reception clock being reproduced from the downlink transmission data received from the communication control station; and
in the radio base station, processing the downlink transmission data using the radio base station reception clock.

10. A mobile communication system comprising a mobile station and a base station operable to return, to the mobile station by means of a TDMA system, a response packet, the response packet being returned by the base station in response to a packet received from the mobile station, and the response packet being returned within a same time slot used for receiving the response packet,
wherein the base station includes:
a radio base station operable to demodulate an uplink packet signal received from the mobile station and extract uplink transmission data, and operable to modulate downlink transmission data to be transmitted to the mobile station and generate a downlink packet signal;

a communication control station operable to receive the uplink transmission data from the radio base station, generate downlink transmission data corresponding to the uplink transmission data received from the radio base station and transmit the generated downlink transmission data to the radio base station; and an inter-station transmission path that establishes a wired connection between the radio base station and the communication control station, wherein the radio base station transmits, to the communication control station, the uplink transmission data, the uplink transmission data being transmitted in a TDMA frame format used for a radio link between the radio base station and the mobile station, wherein the communication control station processes the uplink transmission data received from the radio base station, in the TDMA frame format, and transmits, to the radio base station, the downlink transmission data in the TDMA frame format, wherein the radio base station processes the downlink transmission data received from the communication control station, in the TDMA frame format, wherein the communication control station includes:

a signal generating unit operable to generate (i) a communication control station transmission clock for providing a transmission timing of the downlink transmission data and (ii) a communication control station reception clock for providing a reception timing of the uplink transmission data;

a data generating unit operable to (i) generate the downlink transmission data including a channel data packet, which is within the TDMA frame, to be transmitted inserted therein, and including dummy data for reproducing a radio base station reception clock inserted therein in a period in which the channel data packet to be transmitted is not present, and (ii) transmit the downlink transmission data to the radio base station, in accordance with the communication control station transmission clock; and a reception unit operable to receive, in accordance with the communication control station reception clock, the uplink transmission data, and wherein the radio base station includes:

a reproduction unit operable to reproduce, from the downlink transmission data received from the communication control station, a radio base station reception clock and a radio base station transmission clock, the radio base station reception clock and the radio base station transmission clock being synchronized with the communication control station transmission clock; and a radio unit operable to (i) process the downlink transmission data using the radio base station reception clock reproduced in the reproduction unit and (ii) process the uplink transmission data using the radio base station transmission clock reproduced in the reproduction unit.

11. The mobile communication system according to claim 10, wherein the radio base station further includes an adjusting unit operable to control an amount of overall transmission delays of an entire system by adjusting a phase difference, which occurs according to a length of inter-station transmission paths of the entire system, between the radio base station transmission clock and the communication control station reception clock.

12. The mobile communication system according to claim 10, wherein a plurality of radio base stations are respectively connected to the communication control station via a plurality of respective inter-station transmission paths, wherein, in the communication control station, the reception unit is operable to receive, in a predetermined slot, a plurality of pieces of uplink transmission data, which are respectively outputted from each radio base station of the plurality of radio base stations and which correspond to a same packet received from the mobile station, and wherein the communication control station further includes:

a detection unit operable to detect a reception timing of uplink transmission data, the uplink transmission data corresponding to a packet having been first received; and a selection unit operable to perform a selection process only on uplink transmission data that has been received before a predetermined period of time has passed after the reception timing.

* * * * *